United States Patent
Sinton et al.

(10) Patent No.: US 9,844,757 B2
(45) Date of Patent: Dec. 19, 2017

(54) SEPARATION MEMBRANES FORMED FROM PERFORATED GRAPHENE AND METHODS FOR USE THEREOF

(71) Applicant: LOCKHEED MARTIN CORPORATION, Bethesda, MD (US)

(72) Inventors: Steven W. Sinton, Palo Alto, CA (US); Peter V. Bedworth, Los Gatos, CA (US); Padraig Moloney, Boston, MA (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 14/656,580

(22) Filed: Mar. 12, 2015

(65) Prior Publication Data
US 2015/0258503 A1 Sep. 17, 2015

Related U.S. Application Data

(60) Provisional application No. 61/951,930, filed on Mar. 12, 2014.

(51) Int. Cl.
*B01D 69/12* (2006.01)
*B01D 53/22* (2006.01)
(Continued)

(52) U.S. Cl.
CPC .......... *B01D 69/12* (2013.01); *B01D 53/228* (2013.01); *B01D 67/0062* (2013.01);
(Continued)

(58) Field of Classification Search
CPC .............. B01D 53/228; B01D 67/0062; B01D 67/0079; B01D 69/10; B01D 69/12;
(Continued)

(56) References Cited

U.S. PATENT DOCUMENTS

| 2,187,417 A | 1/1940 | Doble |
| 3,024,153 A | 3/1962 | Kennedy |

(Continued)

FOREIGN PATENT DOCUMENTS

| CA | 2037988 | 9/1992 |
| CA | 2411935 | 12/2002 |

(Continued)

OTHER PUBLICATIONS

CN Office Action in Chinese Application No. 201380013988.9 mailed Aug. 18, 2016 (English translation not readily available).
(Continued)

*Primary Examiner* — Jason M Greene
(74) *Attorney, Agent, or Firm* — Foley & Lardner LLP

(57) ABSTRACT

Perforated graphene sheets can be used in forming separation membranes. Separation membranes of the present disclosure, which can be used in gas separation processes in some embodiments, can include one or more polymer layers and one or more layers of perforated graphene. Methods for separating a gas mixture can include contacting a gas mixture with the separation membranes, and transiting one or more of the gases through the perforated graphene so as to affect separation.

18 Claims, 1 Drawing Sheet

(51) Int. Cl.
  *B01D 71/02* (2006.01)
  *B01D 71/68* (2006.01)
  *C10L 3/10* (2006.01)
  *B01D 67/00* (2006.01)

(52) U.S. Cl.
  CPC ....... *B01D 67/0079* (2013.01); *B01D 71/021* (2013.01); *B01D 2256/245* (2013.01); *B01D 2257/304* (2013.01); *B01D 2257/504* (2013.01); *B01D 2257/80* (2013.01); *C10L 3/103* (2013.01); *C10L 3/104* (2013.01); *C10L 3/106* (2013.01); *C10L 2290/548* (2013.01); *Y02C 10/10* (2013.01)

(58) Field of Classification Search
  CPC ............ B01D 71/021; B01D 2256/245; B01D 2257/304; B01D 2257/504; B01D 2257/80; C10L 3/103; C10L 3/104; C10L 3/106; C10L 2290/548
  USPC .................................................. 95/51; 96/11
  See application file for complete search history.

(56) References Cited

U.S. PATENT DOCUMENTS

| | | |
|---|---|---|
| 3,303,085 A | 2/1967 | Price et al. |
| 3,501,831 A | 3/1970 | Gordon |
| 3,593,854 A | 7/1971 | Swank |
| 3,701,433 A | 10/1972 | Krakauer et al. |
| 3,802,972 A | 4/1974 | Fleischer et al. |
| 4,073,732 A | 2/1978 | Lauer et al. |
| 4,159,954 A | 7/1979 | Gangemi |
| 4,162,220 A | 7/1979 | Servas |
| 4,277,344 A | 7/1981 | Cadotte |
| 4,303,530 A | 12/1981 | Shah et al. |
| 4,743,371 A | 5/1988 | Servas et al. |
| 4,855,058 A | 8/1989 | Holland et al. |
| 4,880,440 A | 11/1989 | Perrin |
| 4,889,626 A | 12/1989 | Browne |
| 4,891,134 A | 1/1990 | Vcelka |
| 4,925,560 A | 5/1990 | Sorrick |
| 4,935,207 A | 6/1990 | Stanbro et al. |
| 4,976,858 A | 12/1990 | Kadoya |
| 5,052,444 A | 10/1991 | Messerly et al. |
| 5,080,770 A | 1/1992 | Culkin |
| 5,156,628 A | 10/1992 | Kranz |
| 5,182,111 A | 1/1993 | Aebischer et al. |
| 5,185,086 A | 2/1993 | Kaali et al. |
| 5,201,767 A | 4/1993 | Caldarise et al. |
| 5,244,981 A | 9/1993 | Seidner et al. |
| 5,314,492 A | 5/1994 | Hamilton et al. |
| 5,314,960 A | 5/1994 | Spinelli et al. |
| 5,314,961 A | 5/1994 | Anton et al. |
| 5,331,067 A | 7/1994 | Seidner et al. |
| 5,344,454 A | 9/1994 | Clarke et al. |
| 5,371,147 A | 12/1994 | Spinelli et al. |
| 5,425,858 A | 6/1995 | Farmer |
| 5,480,449 A | 1/1996 | Hamilton et al. |
| 5,514,181 A | 5/1996 | Light et al. |
| 5,516,522 A | 5/1996 | Peyman et al. |
| 5,549,697 A | 8/1996 | Caldarise |
| 5,562,944 A | 10/1996 | Kafrawy |
| 5,565,210 A | 10/1996 | Rosenthal et al. |
| 5,580,530 A | 12/1996 | Kowatsch et al. |
| 5,595,621 A | 1/1997 | Light et al. |
| 5,636,437 A | 6/1997 | Kaschmitter et al. |
| 5,639,275 A | 6/1997 | Baetge et al. |
| 5,641,323 A | 6/1997 | Caldarise |
| 5,658,334 A | 8/1997 | Caldarise et al. |
| 5,662,158 A | 9/1997 | Caldarise |
| 5,665,118 A | 9/1997 | LaSalle et al. |
| 5,671,897 A | 9/1997 | Ogg et al. |
| 5,679,232 A | 10/1997 | Fedor et al. |
| 5,679,249 A | 10/1997 | Fendya et al. |
| 5,687,788 A | 11/1997 | Caldarise et al. |
| 5,700,477 A | 12/1997 | Rosenthal et al. |
| 5,713,410 A | 2/1998 | LaSalle et al. |
| 5,716,412 A | 2/1998 | DeCarlo et al. |
| 5,716,414 A | 2/1998 | Caldarise |
| 5,725,586 A | 3/1998 | Sommerich |
| 5,731,360 A | 3/1998 | Pekala et al. |
| 5,733,503 A | 3/1998 | Kowatsch et al. |
| 5,746,272 A | 5/1998 | Mastrorio et al. |
| 5,782,286 A | 7/1998 | Sommerich |
| 5,782,289 A | 7/1998 | Mastrorio et al. |
| 5,788,916 A | 8/1998 | Caldarise |
| 5,800,828 A | 9/1998 | Dionne et al. |
| 5,808,312 A | 9/1998 | Fukuda |
| 5,868,727 A | 2/1999 | Barr et al. |
| 5,897,592 A | 4/1999 | Caldarise et al. |
| 5,902,762 A | 5/1999 | Mercuri et al. |
| 5,906,234 A | 5/1999 | Mastrorio et al. |
| 5,910,172 A | 6/1999 | Penenberg |
| 5,910,173 A | 6/1999 | DeCarlo et al. |
| 5,913,998 A | 6/1999 | Butler et al. |
| 5,925,247 A | 7/1999 | Huebbel |
| 5,932,185 A | 8/1999 | Pekala et al. |
| 5,935,084 A | 8/1999 | Southworth |
| 5,935,172 A | 8/1999 | Ochoa et al. |
| 5,954,937 A | 9/1999 | Farmer |
| 5,974,973 A | 11/1999 | Tittgemeyer |
| 5,976,555 A | 11/1999 | Liu et al. |
| 5,980,718 A | 11/1999 | Van Konynenburg et al. |
| 6,008,431 A | 12/1999 | Caldarise et al. |
| 6,013,080 A | 1/2000 | Khalili |
| 6,022,509 A | 2/2000 | Matthews et al. |
| 6,052,608 A | 4/2000 | Young et al. |
| 6,080,393 A | 6/2000 | Liu et al. |
| 6,093,209 A | 7/2000 | Sanders |
| 6,139,585 A | 10/2000 | Li |
| 6,152,882 A | 11/2000 | Prutchi |
| 6,156,323 A | 12/2000 | Verdicchio et al. |
| 6,193,956 B1 | 2/2001 | Liu et al. |
| 6,209,621 B1 | 4/2001 | Treacy |
| 6,213,124 B1 | 4/2001 | Butterworth |
| 6,228,123 B1 | 5/2001 | Dezzani |
| 6,264,699 B1 | 7/2001 | Noiles et al. |
| 6,292,704 B1 | 9/2001 | Malonek et al. |
| 6,309,532 B1 | 10/2001 | Tran et al. |
| 6,346,187 B1 | 2/2002 | Tran et al. |
| 6,375,014 B1 | 4/2002 | Garcera et al. |
| 6,426,214 B1 | 7/2002 | Butler et al. |
| 6,454,095 B1 | 9/2002 | Brisebois et al. |
| 6,455,115 B1 | 9/2002 | Demeyer |
| 6,461,622 B2 | 10/2002 | Liu et al. |
| 6,462,935 B1 | 10/2002 | Shiue et al. |
| 6,521,865 B1 | 2/2003 | Jones et al. |
| 6,532,386 B2 | 3/2003 | Sun et al. |
| 6,580,598 B2 | 6/2003 | Shiue et al. |
| 6,654,229 B2 | 11/2003 | Yanagisawa et al. |
| 6,659,298 B2 | 12/2003 | Wong |
| 6,660,150 B2 | 12/2003 | Conlan et al. |
| 6,661,643 B2 | 12/2003 | Shiue et al. |
| 6,692,627 B1 | 2/2004 | Russell et al. |
| 6,695,880 B1 | 2/2004 | Roffman et al. |
| 6,699,684 B2 | 3/2004 | Ho et al. |
| 6,719,740 B2 | 4/2004 | Burnett et al. |
| 6,905,612 B2 | 6/2005 | Dorian et al. |
| 6,924,190 B2 | 8/2005 | Dennison |
| 7,014,829 B2 | 3/2006 | Yanagisawa et al. |
| 7,071,406 B2 | 7/2006 | Smalley et al. |
| 7,092,753 B2 | 8/2006 | Darvish et al. |
| 7,138,042 B2 | 11/2006 | Tran et al. |
| 7,171,263 B2 | 1/2007 | Darvish et al. |
| 7,175,783 B2 | 2/2007 | Curran |
| 7,179,419 B2 | 2/2007 | Lin et al. |
| 7,190,997 B1 | 3/2007 | Darvish et al. |
| 7,267,753 B2 | 9/2007 | Anex et al. |
| 7,306,768 B2 | 12/2007 | Chiga |
| 7,357,255 B2 | 4/2008 | Ginsberg et al. |
| 7,374,677 B2 | 5/2008 | McLaughlin et al. |
| 7,381,707 B2 | 6/2008 | Lin et al. |
| 7,382,601 B2 | 6/2008 | Yoshimitsu |

(56) References Cited

U.S. PATENT DOCUMENTS

| | | |
|---|---|---|
| 7,434,692 B2 | 10/2008 | Ginsberg et al. |
| 7,452,547 B2 | 11/2008 | Lambino et al. |
| 7,459,121 B2 | 12/2008 | Liang et al. |
| 7,460,907 B1 | 12/2008 | Darvish et al. |
| 7,476,222 B2 | 1/2009 | Sun et al. |
| 7,477,939 B2 | 1/2009 | Sun et al. |
| 7,477,940 B2 | 1/2009 | Sun et al. |
| 7,477,941 B2 | 1/2009 | Sun et al. |
| 7,479,133 B2 | 1/2009 | Sun et al. |
| 7,505,250 B2 | 3/2009 | Cho et al. |
| 7,531,094 B2 | 5/2009 | McLaughlin et al. |
| 7,600,567 B2 | 10/2009 | Christopher et al. |
| 7,631,764 B2 | 12/2009 | Ginsberg et al. |
| 7,650,805 B2 | 1/2010 | Nauseda et al. |
| 7,674,477 B1 | 3/2010 | Schmid et al. |
| 7,706,128 B2 | 4/2010 | Bourcier |
| 7,761,809 B2 | 7/2010 | Bukovec et al. |
| 7,786,086 B2 | 8/2010 | Reches et al. |
| 7,866,475 B2 | 1/2011 | Doskoczynski et al. |
| 7,875,293 B2 | 1/2011 | Shults et al. |
| 7,935,331 B2 | 5/2011 | Lin |
| 7,935,416 B2 | 5/2011 | Yang et al. |
| 7,943,167 B2 | 5/2011 | Kulkarni et al. |
| 7,960,708 B2 | 6/2011 | Wolfe et al. |
| 7,998,246 B2 | 8/2011 | Liu et al. |
| 8,109,893 B2 | 2/2012 | Lande |
| 8,147,599 B2 | 4/2012 | McAlister |
| 8,262,943 B2 | 9/2012 | Meng et al. |
| 8,308,702 B2 | 11/2012 | Batchvarova et al. |
| 8,316,865 B2 | 11/2012 | Ochs et al. |
| 8,329,476 B2 | 12/2012 | Pitkanen et al. |
| 8,354,296 B2 | 1/2013 | Dimitrakopoulos et al. |
| 8,361,321 B2 | 1/2013 | Stetson et al. |
| 8,449,504 B2 | 5/2013 | Carter et al. |
| 8,475,689 B2 | 7/2013 | Sun et al. |
| 8,506,807 B2 | 8/2013 | Lee et al. |
| 8,512,669 B2 | 8/2013 | Hauck |
| 8,513,324 B2 | 8/2013 | Scales et al. |
| 8,535,726 B2 | 9/2013 | Dai et al. |
| 8,592,291 B2 | 11/2013 | Shi et al. |
| 8,617,411 B2 | 12/2013 | Singh |
| 8,666,471 B2 | 3/2014 | Rogers et al. |
| 8,686,249 B1 | 4/2014 | Whitaker et al. |
| 8,697,230 B2 | 4/2014 | Ago et al. |
| 8,698,481 B2 | 4/2014 | Lieber et al. |
| 8,715,329 B2 | 5/2014 | Robinson et al. |
| 8,721,074 B2 | 5/2014 | Pugh et al. |
| 8,734,421 B2 | 5/2014 | Sun et al. |
| 8,744,567 B2 | 6/2014 | Fassih et al. |
| 8,751,015 B2 | 6/2014 | Frewin et al. |
| 8,753,468 B2 | 6/2014 | Caldwell et al. |
| 8,759,153 B2 | 6/2014 | Elian et al. |
| 8,808,257 B2 | 8/2014 | Pugh et al. |
| 8,828,211 B2 | 9/2014 | Garaj et al. |
| 8,840,552 B2 | 9/2014 | Brauker et al. |
| 8,857,983 B2 | 10/2014 | Pugh et al. |
| 8,861,821 B2 | 10/2014 | Osumi |
| 8,894,201 B2 | 11/2014 | Pugh et al. |
| 8,940,552 B2 | 1/2015 | Pugh et al. |
| 8,950,862 B2 | 2/2015 | Pugh et al. |
| 8,974,055 B2 | 3/2015 | Pugh et al. |
| 8,975,121 B2 | 3/2015 | Pugh et al. |
| 8,979,978 B2 | 3/2015 | Miller et al. |
| 8,986,932 B2 | 3/2015 | Turner et al. |
| 8,993,234 B2 | 3/2015 | Turner et al. |
| 8,993,327 B2 | 3/2015 | McKnight et al. |
| 9,014,639 B2 | 4/2015 | Pugh et al. |
| 9,017,937 B1 | 4/2015 | Turner et al. |
| 9,023,220 B2 | 5/2015 | Graphenea |
| 9,028,663 B2 | 5/2015 | Stetson, Jr. et al. |
| 9,035,282 B2 | 5/2015 | Dimitrakopoulos et al. |
| 9,045,847 B2 | 6/2015 | Batchvarova et al. |
| 9,050,452 B2 | 6/2015 | Sun et al. |
| 9,052,533 B2 | 6/2015 | Pugh et al. |
| 9,056,282 B2 | 6/2015 | Miller et al. |
| 9,062,180 B2 | 6/2015 | Scales et al. |
| 9,067,811 B1 | 6/2015 | Bennett et al. |
| 9,070,615 B2 | 6/2015 | Elian et al. |
| 9,075,009 B2 | 7/2015 | Kim et al. |
| 9,080,267 B2 | 7/2015 | Batchvarova et al. |
| 9,095,823 B2 | 8/2015 | Fleming |
| 9,096,050 B2 | 8/2015 | Bedell et al. |
| 9,096,437 B2 | 8/2015 | Tour et al. |
| 9,102,111 B2 | 8/2015 | Pugh et al. |
| 9,108,158 B2 | 8/2015 | Yu et al. |
| 9,110,310 B2 | 8/2015 | Pugh et al. |
| 9,125,715 B2 | 9/2015 | Pugh et al. |
| 9,134,546 B2 | 9/2015 | Pugh et al. |
| 9,169,575 B1 | 10/2015 | Bedworth et al. |
| 9,170,646 B2 | 10/2015 | Toner et al. |
| 9,185,486 B2 | 11/2015 | Pugh |
| 9,193,587 B2 | 11/2015 | Bennett |
| 9,195,075 B2 | 11/2015 | Pugh et al. |
| 9,225,375 B2 | 12/2015 | Pugh et al. |
| 9,242,865 B2 | 1/2016 | Sinton et al. |
| 9,388,048 B2 | 7/2016 | Zhou et al. |
| 9,425,709 B2 | 8/2016 | Hayashi et al. |
| 9,463,421 B2 | 10/2016 | Fleming |
| 9,475,709 B2 | 10/2016 | Stetson et al. |
| 9,480,952 B2 | 11/2016 | Sinton et al. |
| 9,505,192 B2 | 11/2016 | Stoltenberg et al. |
| 9,567,224 B2 | 2/2017 | Bedworth |
| 9,572,918 B2 | 2/2017 | Bachmann et al. |
| 9,592,475 B2 | 3/2017 | Stoltenberg et al. |
| 9,610,546 B2 | 4/2017 | Sinton et al. |
| 2001/0036556 A1 | 11/2001 | Jen |
| 2001/0047157 A1 | 11/2001 | Burnett et al. |
| 2001/0055597 A1 | 12/2001 | Liu et al. |
| 2002/0079004 A1 | 6/2002 | Sato et al. |
| 2002/0079054 A1 | 6/2002 | Nakatani |
| 2002/0104435 A1 | 8/2002 | Baker et al. |
| 2002/0115957 A1 | 8/2002 | Sun et al. |
| 2002/0183682 A1 | 12/2002 | Darvish et al. |
| 2002/0183686 A1 | 12/2002 | Darvish et al. |
| 2003/0052354 A1 | 3/2003 | Dennison |
| 2003/0134281 A1 | 7/2003 | Evans |
| 2003/0138777 A1 | 7/2003 | Evans |
| 2003/0146221 A1 | 8/2003 | Lauer et al. |
| 2003/0159985 A1 | 8/2003 | Siwy et al. |
| 2004/0061253 A1 | 4/2004 | Kleinmeyer et al. |
| 2004/0063097 A1 | 4/2004 | Evans |
| 2004/0099324 A1 | 5/2004 | Fraser et al. |
| 2004/0111968 A1 | 6/2004 | Day et al. |
| 2004/0112865 A1 | 6/2004 | McCullough et al. |
| 2004/0121488 A1 | 6/2004 | Chang et al. |
| 2004/0142463 A1 | 7/2004 | Walker et al. |
| 2004/0185730 A1 | 9/2004 | Lambino et al. |
| 2004/0193043 A1 | 9/2004 | Duchon et al. |
| 2004/0199243 A1 | 10/2004 | Yodfat |
| 2004/0217036 A1 | 11/2004 | Ginsberg et al. |
| 2004/0241214 A1 | 12/2004 | Kirkwood et al. |
| 2004/0251136 A1 | 12/2004 | Lean et al. |
| 2005/0004508 A1 | 1/2005 | Sun et al. |
| 2005/0004509 A1 | 1/2005 | Sun et al. |
| 2005/0004550 A1 | 1/2005 | Sun et al. |
| 2005/0010161 A1 | 1/2005 | Sun et al. |
| 2005/0010192 A1 | 1/2005 | Sun et al. |
| 2005/0015042 A1 | 1/2005 | Sun et al. |
| 2005/0053563 A1 | 3/2005 | Manissier et al. |
| 2005/0112078 A1 | 5/2005 | Boddupalli et al. |
| 2005/0126966 A1 | 6/2005 | Tanida et al. |
| 2005/0129633 A1 | 6/2005 | Lin |
| 2005/0148996 A1 | 7/2005 | Sun et al. |
| 2005/0170089 A1 | 8/2005 | Lashmore et al. |
| 2005/0189673 A1 | 9/2005 | Klug et al. |
| 2005/0226834 A1 | 10/2005 | Lambino et al. |
| 2005/0238730 A1 | 10/2005 | Le Fur et al. |
| 2006/0005381 A1 | 1/2006 | Nishi et al. |
| 2006/0036332 A1 | 2/2006 | Jennings |
| 2006/0073370 A1 | 4/2006 | Krusic et al. |
| 2006/0093885 A1 | 5/2006 | Krusic et al. |
| 2006/0121279 A1 | 6/2006 | Petrik |
| 2006/0151382 A1 | 7/2006 | Petrik |
| 2006/0166347 A1 | 7/2006 | Faulstich et al. |

(56) References Cited

U.S. PATENT DOCUMENTS

| | | |
|---|---|---|
| 2006/0180604 A1 | 8/2006 | Ginsberg et al. |
| 2006/0222701 A1 | 10/2006 | Kulkarni et al. |
| 2006/0253078 A1 | 11/2006 | Wu et al. |
| 2007/0004640 A1 | 1/2007 | Lin et al. |
| 2007/0032054 A1 | 2/2007 | Ramaswamy et al. |
| 2007/0056894 A1 | 3/2007 | Connors, Jr. |
| 2007/0060862 A1 | 3/2007 | Sun et al. |
| 2007/0062856 A1 | 3/2007 | Pahl et al. |
| 2007/0099813 A1 | 5/2007 | Luizzi et al. |
| 2007/0131646 A1 | 6/2007 | Donnelly et al. |
| 2007/0284279 A1 | 12/2007 | Doskoczynski et al. |
| 2008/0017564 A1 | 1/2008 | Hammond |
| 2008/0035484 A1 | 2/2008 | Wu et al. |
| 2008/0035541 A1 | 2/2008 | Franzreb et al. |
| 2008/0045877 A1 | 2/2008 | Levin et al. |
| 2008/0061477 A1 | 3/2008 | Capizzo |
| 2008/0063585 A1 | 3/2008 | Smalley et al. |
| 2008/0081323 A1 | 4/2008 | Keeley et al. |
| 2008/0081362 A1 | 4/2008 | Keeley et al. |
| 2008/0149561 A1 | 6/2008 | Chu et al. |
| 2008/0156648 A1 | 7/2008 | Dudziak et al. |
| 2008/0170982 A1 | 7/2008 | Zhang et al. |
| 2008/0185293 A1 | 8/2008 | Klose et al. |
| 2008/0188836 A1 | 8/2008 | Weber et al. |
| 2008/0190508 A1 | 8/2008 | Booth et al. |
| 2008/0241085 A1 | 10/2008 | Lin et al. |
| 2008/0268016 A1 | 10/2008 | Fang et al. |
| 2008/0290020 A1 | 11/2008 | Marand et al. |
| 2008/0290111 A1 | 11/2008 | Ginsberg et al. |
| 2009/0023572 A1 | 1/2009 | Backes et al. |
| 2009/0039019 A1 | 2/2009 | Raman |
| 2009/0048685 A1 | 2/2009 | Frigstad et al. |
| 2009/0075371 A1 | 3/2009 | Keeley et al. |
| 2009/0087395 A1 | 4/2009 | Lin et al. |
| 2009/0117335 A1 | 5/2009 | Iyoda et al. |
| 2009/0148495 A1 | 6/2009 | Hammer et al. |
| 2009/0176159 A1 | 7/2009 | Zhamu et al. |
| 2009/0222072 A1 | 9/2009 | Robinson et al. |
| 2009/0236295 A1 | 9/2009 | Braun et al. |
| 2009/0241242 A1 | 10/2009 | Beatty et al. |
| 2009/0283475 A1 | 11/2009 | Hylton et al. |
| 2009/0291270 A1 | 11/2009 | Zettl et al. |
| 2009/0294300 A1 | 12/2009 | Kanzius et al. |
| 2009/0306364 A1 | 12/2009 | Beer et al. |
| 2010/0000754 A1 | 1/2010 | Mann et al. |
| 2010/0016778 A1 | 1/2010 | Chattopadhyay |
| 2010/0021708 A1 | 1/2010 | Kong et al. |
| 2010/0024722 A1 | 2/2010 | Ochs et al. |
| 2010/0024838 A1 | 2/2010 | Ochs et al. |
| 2010/0025330 A1 | 2/2010 | Ratto et al. |
| 2010/0055464 A1 | 3/2010 | Sung |
| 2010/0059378 A1 | 3/2010 | Elson et al. |
| 2010/0072643 A1 | 3/2010 | Pugh et al. |
| 2010/0076553 A1 | 3/2010 | Pugh et al. |
| 2010/0105834 A1 | 4/2010 | Tour et al. |
| 2010/0110372 A1 | 5/2010 | Pugh et al. |
| 2010/0124564 A1 | 5/2010 | Martinson et al. |
| 2010/0127312 A1 | 5/2010 | Grebel et al. |
| 2010/0161014 A1 | 6/2010 | Lynch et al. |
| 2010/0167551 A1 | 7/2010 | Dedontney |
| 2010/0196439 A1 | 8/2010 | Beck et al. |
| 2010/0209515 A1 | 8/2010 | Chantalat et al. |
| 2010/0213079 A1 | 8/2010 | Willis |
| 2010/0224555 A1 | 9/2010 | Hoek et al. |
| 2010/0228204 A1 | 9/2010 | Beatty et al. |
| 2010/0233781 A1 | 9/2010 | Bangera et al. |
| 2010/0249273 A1 | 9/2010 | Scales et al. |
| 2010/0258111 A1 | 10/2010 | Shah et al. |
| 2010/0323177 A1 | 12/2010 | Ruoff et al. |
| 2010/0327847 A1 | 12/2010 | Leiber et al. |
| 2011/0014217 A1 | 1/2011 | Fahmy et al. |
| 2011/0037033 A1 | 2/2011 | Green et al. |
| 2011/0041519 A1 | 2/2011 | McAlister |
| 2011/0041687 A1* | 2/2011 | Diaz .................. B01D 53/228 95/49 |
| 2011/0045523 A1 | 2/2011 | Strano et al. |
| 2011/0054418 A1 | 3/2011 | Pugh et al. |
| 2011/0054576 A1 | 3/2011 | Robinson et al. |
| 2011/0056892 A1 | 3/2011 | Lancaster |
| 2011/0073563 A1 | 3/2011 | Chang et al. |
| 2011/0092054 A1 | 4/2011 | Seo et al. |
| 2011/0092949 A1 | 4/2011 | Wang |
| 2011/0100921 A1 | 5/2011 | Heinrich |
| 2011/0112484 A1 | 5/2011 | Carter et al. |
| 2011/0118655 A1 | 5/2011 | Fassih et al. |
| 2011/0120970 A1 | 5/2011 | Joo et al. |
| 2011/0124253 A1 | 5/2011 | Shah et al. |
| 2011/0139707 A1 | 6/2011 | Siwy et al. |
| 2011/0152795 A1 | 6/2011 | Aledo et al. |
| 2011/0201201 A1 | 8/2011 | Arnold et al. |
| 2011/0202201 A1 | 8/2011 | Matsubara |
| 2011/0253630 A1 | 10/2011 | Bakajin et al. |
| 2011/0258791 A1 | 10/2011 | Batchvarova et al. |
| 2011/0258796 A1 | 10/2011 | Batchvarova et al. |
| 2011/0262645 A1 | 10/2011 | Batchvarova et al. |
| 2011/0263912 A1 | 10/2011 | Miller et al. |
| 2011/0269920 A1 | 11/2011 | Min et al. |
| 2012/0031833 A1 | 2/2012 | Ho et al. |
| 2012/0048804 A1 | 3/2012 | Stetson et al. |
| 2012/0116228 A1 | 5/2012 | Okubo |
| 2012/0145548 A1 | 6/2012 | Sivan et al. |
| 2012/0148633 A1 | 6/2012 | Sun et al. |
| 2012/0162600 A1 | 6/2012 | Pugh et al. |
| 2012/0183738 A1 | 7/2012 | Zettl et al. |
| 2012/0186850 A1 | 7/2012 | Sugiyama et al. |
| 2012/0211367 A1 | 8/2012 | Vecitis |
| 2012/0218508 A1 | 8/2012 | Pugh et al. |
| 2012/0220053 A1 | 8/2012 | Lee et al. |
| 2012/0234453 A1 | 9/2012 | Pugh et al. |
| 2012/0234679 A1 | 9/2012 | Garaj et al. |
| 2012/0235277 A1 | 9/2012 | Pugh et al. |
| 2012/0236254 A1 | 9/2012 | Pugh et al. |
| 2012/0236524 A1 | 9/2012 | Pugh et al. |
| 2012/0241371 A1 | 9/2012 | Revanur et al. |
| 2012/0242953 A1 | 9/2012 | Pugh et al. |
| 2012/0255899 A1* | 10/2012 | Choi .................. B01D 53/228 210/489 |
| 2012/0267337 A1 | 10/2012 | Striemer et al. |
| 2012/0292245 A1 | 11/2012 | Saito |
| 2012/0298396 A1 | 11/2012 | Hong et al. |
| 2012/0301707 A1 | 11/2012 | Kinloch et al. |
| 2013/0015136 A1 | 1/2013 | Bennett |
| 2013/0034760 A1 | 2/2013 | Otts et al. |
| 2013/0045523 A1 | 2/2013 | Leach et al. |
| 2013/0056367 A1 | 3/2013 | Martinez et al. |
| 2013/0071941 A1 | 3/2013 | Miller |
| 2013/0096292 A1 | 4/2013 | Brahmasandra et al. |
| 2013/0100436 A1 | 4/2013 | Jackson et al. |
| 2013/0105417 A1 | 5/2013 | Stetson et al. |
| 2013/0108839 A1 | 5/2013 | Arnold et al. |
| 2013/0116541 A1 | 5/2013 | Gracias et al. |
| 2013/0131214 A1 | 5/2013 | Scales et al. |
| 2013/0135578 A1 | 5/2013 | Pugh et al. |
| 2013/0146221 A1 | 6/2013 | Kolmakov et al. |
| 2013/0146480 A1 | 6/2013 | Garaj et al. |
| 2013/0152386 A1 | 6/2013 | Pandojirao-S et al. |
| 2013/0174978 A1 | 7/2013 | Pugh et al. |
| 2013/0190476 A1 | 7/2013 | Lancaster et al. |
| 2013/0192460 A1* | 8/2013 | Miller .................. B01D 71/021 95/47 |
| 2013/0192461 A1 | 8/2013 | Miller et al. |
| 2013/0194540 A1 | 8/2013 | Pugh et al. |
| 2013/0213568 A1 | 8/2013 | Pugh et al. |
| 2013/0215377 A1 | 8/2013 | Pugh et al. |
| 2013/0215378 A1 | 8/2013 | Pugh et al. |
| 2013/0215380 A1 | 8/2013 | Pugh et al. |
| 2013/0216581 A1 | 8/2013 | Fahmy et al. |
| 2013/0240355 A1 | 9/2013 | Ho et al. |
| 2013/0240437 A1 | 9/2013 | Rodrigues et al. |
| 2013/0248097 A1 | 9/2013 | Ploss, Jr. |
| 2013/0248367 A1 | 9/2013 | Stetson et al. |
| 2013/0249147 A1 | 9/2013 | Bedworth |
| 2013/0256118 A1 | 10/2013 | Meller et al. |
| 2013/0256139 A1 | 10/2013 | Peng |

(56) References Cited

U.S. PATENT DOCUMENTS

| | | |
|---|---|---|
| 2013/0256154 A1 | 10/2013 | Peng |
| 2013/0256210 A1 | 10/2013 | Fleming |
| 2013/0256211 A1 | 10/2013 | Fleming |
| 2013/0261568 A1 | 10/2013 | Martinson et al. |
| 2013/0269819 A1 | 10/2013 | Ruby et al. |
| 2013/0270188 A1* | 10/2013 | Karnik ............... B01D 53/228 210/650 |
| 2013/0273288 A1 | 10/2013 | Luo et al. |
| 2013/0277305 A1 | 10/2013 | Stetson et al. |
| 2013/0295150 A1 | 11/2013 | Chantalat et al. |
| 2013/0309776 A1 | 11/2013 | Drndic et al. |
| 2013/0317131 A1 | 11/2013 | Scales et al. |
| 2013/0317132 A1 | 11/2013 | Scales et al. |
| 2013/0317133 A1 | 11/2013 | Scales et al. |
| 2013/0323295 A1 | 12/2013 | Scales et al. |
| 2013/0338611 A1 | 12/2013 | Pugh et al. |
| 2013/0338744 A1 | 12/2013 | Frewin et al. |
| 2014/0002788 A1 | 1/2014 | Otts et al. |
| 2014/0005514 A1 | 1/2014 | Pugh et al. |
| 2014/0015160 A1 | 1/2014 | Kung et al. |
| 2014/0017322 A1 | 1/2014 | Dai et al. |
| 2014/0048411 A1 | 2/2014 | Choi et al. |
| 2014/0066958 A1 | 3/2014 | Priewe |
| 2014/0079936 A1 | 3/2014 | Russo et al. |
| 2014/0093728 A1 | 4/2014 | Shah et al. |
| 2014/0128891 A1 | 5/2014 | Astani-Matthies et al. |
| 2014/0141521 A1 | 5/2014 | Peng et al. |
| 2014/0151288 A1 | 6/2014 | Miller et al. |
| 2014/0151631 A1 | 6/2014 | Duesberg et al. |
| 2014/0154464 A1 | 6/2014 | Miller et al. |
| 2014/0170195 A1 | 6/2014 | Fassih et al. |
| 2014/0171541 A1 | 6/2014 | Scales et al. |
| 2014/0174927 A1 | 6/2014 | Bashir et al. |
| 2014/0190004 A1 | 7/2014 | Riall et al. |
| 2014/0190550 A1 | 7/2014 | Loh et al. |
| 2014/0190676 A1 | 7/2014 | Zhamu et al. |
| 2014/0190833 A1 | 7/2014 | Lieber et al. |
| 2014/0192313 A1 | 7/2014 | Riall et al. |
| 2014/0192314 A1 | 7/2014 | Riall et al. |
| 2014/0199777 A2 | 7/2014 | Ruiz et al. |
| 2014/0209539 A1 | 7/2014 | El Badawi et al. |
| 2014/0212596 A1 | 7/2014 | Jahangiri-Famenini |
| 2014/0230653 A1 | 8/2014 | Yu et al. |
| 2014/0230733 A1 | 8/2014 | Miller |
| 2014/0231351 A1 | 8/2014 | Wickramasinghe et al. |
| 2014/0248621 A1 | 9/2014 | Collins |
| 2014/0257348 A1 | 9/2014 | Priewe et al. |
| 2014/0257517 A1 | 9/2014 | Deichmann et al. |
| 2014/0259657 A1 | 9/2014 | Riall et al. |
| 2014/0261999 A1 | 9/2014 | Stetson et al. |
| 2014/0263035 A1 | 9/2014 | Stoltenberg et al. |
| 2014/0263178 A1 | 9/2014 | Sinton et al. |
| 2014/0264977 A1 | 9/2014 | Pugh et al. |
| 2014/0268015 A1 | 9/2014 | Riall et al. |
| 2014/0268020 A1 | 9/2014 | Pugh et al. |
| 2014/0268021 A1 | 9/2014 | Pugh et al. |
| 2014/0268026 A1 | 9/2014 | Pugh et al. |
| 2014/0272286 A1 | 9/2014 | Stoltenberg et al. |
| 2014/0272522 A1 | 9/2014 | Pugh et al. |
| 2014/0273315 A1 | 9/2014 | Pugh et al. |
| 2014/0273316 A1 | 9/2014 | Pugh et al. |
| 2014/0276481 A1 | 9/2014 | Pugh et al. |
| 2014/0276999 A1 | 9/2014 | Harms et al. |
| 2014/0306361 A1 | 10/2014 | Pugh et al. |
| 2014/0308681 A1 | 10/2014 | Strano et al. |
| 2014/0315213 A1 | 10/2014 | Nagrath et al. |
| 2014/0318373 A1 | 10/2014 | Wood et al. |
| 2014/0322518 A1* | 10/2014 | Addleman ......... B01D 67/0079 428/304.4 |
| 2014/0333892 A1 | 11/2014 | Pugh et al. |
| 2014/0335661 A1 | 11/2014 | Pugh et al. |
| 2014/0343580 A1 | 11/2014 | Priewe |
| 2014/0346081 A1 | 11/2014 | Sowden et al. |
| 2014/0349892 A1 | 11/2014 | Van Der Zaag et al. |
| 2014/0350372 A1 | 11/2014 | Pugh et al. |
| 2014/0377651 A1 | 12/2014 | Kwon et al. |
| 2014/0377738 A1 | 12/2014 | Bachmann et al. |
| 2015/0015843 A1 | 1/2015 | Pugh et al. |
| 2015/0017918 A1 | 1/2015 | Pugh et al. |
| 2015/0057762 A1 | 2/2015 | Harms et al. |
| 2015/0061990 A1 | 3/2015 | Toner et al. |
| 2015/0062533 A1 | 3/2015 | Toner et al. |
| 2015/0063605 A1 | 3/2015 | Pugh |
| 2015/0066063 A1 | 3/2015 | Priewe |
| 2015/0075667 A1 | 3/2015 | McHugh et al. |
| 2015/0077658 A1 | 3/2015 | Pugh et al. |
| 2015/0077659 A1 | 3/2015 | Pugh et al. |
| 2015/0077660 A1 | 3/2015 | Pugh et al. |
| 2015/0077661 A1 | 3/2015 | Pugh et al. |
| 2015/0077662 A1 | 3/2015 | Pugh et al. |
| 2015/0077663 A1 | 3/2015 | Pugh et al. |
| 2015/0077699 A1 | 3/2015 | De Sio et al. |
| 2015/0077702 A9 | 3/2015 | Pugh et al. |
| 2015/0079683 A1 | 3/2015 | Yager et al. |
| 2015/0087249 A1 | 3/2015 | Pugh et al. |
| 2015/0096935 A1 | 4/2015 | Mitra et al. |
| 2015/0098910 A1 | 4/2015 | Mordas et al. |
| 2015/0101931 A1 | 4/2015 | Garaj et al. |
| 2015/0105686 A1 | 4/2015 | Vasan |
| 2015/0118318 A1 | 4/2015 | Fahmy et al. |
| 2015/0122727 A1 | 5/2015 | Karnik et al. |
| 2015/0138454 A1 | 5/2015 | Pugh et al. |
| 2015/0142107 A1 | 5/2015 | Pugh et al. |
| 2015/0145155 A1 | 5/2015 | Pugh et al. |
| 2015/0146162 A1 | 5/2015 | Pugh et al. |
| 2015/0147474 A1 | 5/2015 | Batchvarova et al. |
| 2015/0170788 A1 | 6/2015 | Miller et al. |
| 2015/0174253 A1 | 6/2015 | Sun et al. |
| 2015/0174254 A1 | 6/2015 | Sun et al. |
| 2015/0182473 A1 | 7/2015 | Bosnyak et al. |
| 2015/0185180 A1 | 7/2015 | Ruhl et al. |
| 2015/0196579 A1 | 7/2015 | Ferrante et al. |
| 2015/0202351 A1 | 7/2015 | Kaplan et al. |
| 2015/0212339 A1 | 7/2015 | Pugh et al. |
| 2015/0217219 A1 | 8/2015 | Sinsabaugh et al. |
| 2015/0218210 A1 | 8/2015 | Stetson et al. |
| 2015/0221474 A1 | 8/2015 | Bedworth |
| 2015/0231557 A1 | 8/2015 | Miller et al. |
| 2015/0231577 A1 | 8/2015 | Nair et al. |
| 2015/0247178 A1 | 9/2015 | Mountcastle et al. |
| 2015/0258254 A1 | 9/2015 | Simon et al. |
| 2015/0258498 A1 | 9/2015 | Simon et al. |
| 2015/0258502 A1 | 9/2015 | Turowski |
| 2015/0258503 A1 | 9/2015 | Sinton et al. |
| 2015/0258525 A1 | 9/2015 | Westman et al. |
| 2015/0268150 A1 | 9/2015 | Newkirk et al. |
| 2015/0272834 A1 | 10/2015 | Sun et al. |
| 2015/0272896 A1 | 10/2015 | Sun et al. |
| 2015/0273401 A1* | 10/2015 | Miller ............... B01D 71/021 210/500.25 |
| 2015/0309337 A1 | 10/2015 | Flitsch et al. |
| 2015/0321147 A1 | 11/2015 | Fleming et al. |
| 2015/0321149 A1 | 11/2015 | McGinnis |
| 2015/0323811 A1 | 11/2015 | Flitsch et al. |
| 2015/0336202 A1 | 11/2015 | Bedworth et al. |
| 2015/0342900 A1 | 12/2015 | Putnins |
| 2015/0346382 A1 | 12/2015 | Bliven et al. |
| 2015/0351887 A1 | 12/2015 | Peters |
| 2015/0359742 A1 | 12/2015 | Fassih et al. |
| 2015/0378176 A1 | 12/2015 | Flitsch et al. |
| 2016/0009049 A1 | 1/2016 | Stoltenberg et al. |
| 2016/0038885 A1 | 2/2016 | Hogen-Esch et al. |
| 2016/0043384 A1 | 2/2016 | Zhamu et al. |
| 2016/0058932 A1 | 3/2016 | Stetson et al. |
| 2016/0059190 A1 | 3/2016 | Yoo et al. |
| 2016/0067390 A1 | 3/2016 | Simon et al. |
| 2016/0074814 A1* | 3/2016 | Park ................... B01D 69/12 210/500.33 |
| 2016/0074815 A1 | 3/2016 | Sinton et al. |
| 2016/0272499 A1 | 9/2016 | Graphenea |
| 2016/0282326 A1 | 9/2016 | Waduge et al. |
| 2016/0284811 A1 | 9/2016 | Yu et al. |
| 2016/0339160 A1 | 11/2016 | Bedworth et al. |

(56) References Cited

U.S. PATENT DOCUMENTS

| | | |
|---|---|---|
| 2017/0032962 A1 | 2/2017 | Graphenea |
| 2017/0037356 A1 | 2/2017 | Simon et al. |
| 2017/0057812 A1 | 3/2017 | Graphenea |

FOREIGN PATENT DOCUMENTS

| | | |
|---|---|---|
| CN | 1128501 A | 8/1996 |
| CN | 101108194 A | 1/2008 |
| CN | 101243544 | 8/2008 |
| CN | 101428198 A | 5/2009 |
| CN | 101489653 A | 7/2009 |
| CN | 101996853 A | 3/2011 |
| CN | 102242062 A | 11/2011 |
| CN | 102344132 | 2/2012 |
| CN | 102423272 | 4/2012 |
| CN | 102592720 A | 7/2012 |
| CN | 101996853 B | 8/2012 |
| CN | 102637584 A | 8/2012 |
| CN | 103153441 | 6/2013 |
| CN | 103182249 A | 7/2013 |
| CN | 103603706 A | 2/2014 |
| DE | 19536560 | 3/1997 |
| DE | 10 2005 049 388 A1 | 4/2007 |
| EP | 0 364 628 A1 | 4/1990 |
| EP | 1 034 251 | 1/2004 |
| EP | 1 777 250 A1 | 4/2007 |
| EP | 1 872 812 | 1/2008 |
| EP | 2 060 286 | 5/2009 |
| EP | 2 107 120 A1 | 10/2009 |
| EP | 2 230 511 A1 | 9/2010 |
| EP | 1 603 609 | 5/2011 |
| EP | 2 354 272 | 8/2011 |
| EP | 2 450 096 | 5/2012 |
| EP | 2 489 520 | 8/2012 |
| EP | 2 511 002 | 10/2012 |
| EP | 2 586 473 | 5/2013 |
| EP | 2 679 540 | 1/2014 |
| EP | 2 937 313 | 10/2015 |
| EP | 3 070 053 | 9/2016 |
| EP | 3 084 398 | 10/2016 |
| EP | 1 538 2430.5 | 3/2017 |
| EP | 3 135 631 | 3/2017 |
| JP | 59-102111 | 7/1984 |
| JP | 10-510471 | 5/1995 |
| JP | 7504120 | 5/1995 |
| JP | 2001-232158 | 8/2001 |
| JP | 2004-179014 | 6/2004 |
| JP | 2005-126966 | 5/2005 |
| JP | 2006-188393 | 7/2006 |
| JP | 2011-168448 A | 9/2011 |
| JP | 2011-241479 | 12/2011 |
| JP | 2004-202480 | 7/2014 |
| JP | 2015-503405 | 2/2015 |
| JP | 2016-175828 | 10/2016 |
| KR | 1020110084110 | 7/2011 |
| KR | 1020120022164 A | 3/2012 |
| KR | 10-2012-0022164 A | 1/2014 |
| KR | 1020140002570 | 1/2014 |
| WO | WO-93/33901 | 3/1993 |
| WO | WO-93/12859 | 8/1993 |
| WO | WO-95/00231 | 1/1995 |
| WO | WO-97/12664 A1 | 4/1997 |
| WO | WO-98/30501 A2 | 7/1998 |
| WO | WO-00/70012 | 11/2000 |
| WO | WO-02/055539 A1 | 7/2002 |
| WO | WO-2013/115762 | 8/2003 |
| WO | WO-2004/009840 A1 | 1/2004 |
| WO | WO-2004/082733 | 9/2004 |
| WO | WO-2005/047857 A2 | 5/2005 |
| WO | WO-2007/103411 A2 | 9/2007 |
| WO | WO-2007/140252 A1 | 12/2007 |
| WO | WO-2008/008533 | 1/2008 |
| WO | WO-2009/129984 A1 | 10/2009 |
| WO | WO-2010/006080 | 1/2010 |
| WO | WO-2010/115904 A1 | 10/2010 |
| WO | WO-2011/019686 A1 | 2/2011 |
| WO | WO-2011/046706 A1 | 4/2011 |
| WO | WO-2011/001674 | 6/2011 |
| WO | WO-2011/063458 A1 | 6/2011 |
| WO | WO-2011/075158 | 6/2011 |
| WO | WO-2011/094204 A2 | 8/2011 |
| WO | WO-2011/100458 A2 | 8/2011 |
| WO | WO-2011/138689 A2 | 11/2011 |
| WO | WO-2012/006657 A1 | 1/2012 |
| WO | WO-2012/021801 A2 | 2/2012 |
| WO | WO-2012/027148 A1 | 3/2012 |
| WO | WO-2012/028695 | 3/2012 |
| WO | WO-2012/030368 A1 | 3/2012 |
| WO | WO-2012/125770 | 9/2012 |
| WO | WO-2012/138671 A2 | 10/2012 |
| WO | WO-2012/142852 A1 | 10/2012 |
| WO | WO-2013/016445 A1 | 1/2013 |
| WO | WO-2013/048063 A1 | 4/2013 |
| WO | WO-2013/138137 A1 | 9/2013 |
| WO | WO-2013/138698 A1 | 9/2013 |
| WO | WO-2013/151799 | 10/2013 |
| WO | WO-2013/152179 A1 | 10/2013 |
| WO | WO-2014/084861 A1 | 6/2014 |
| WO | WO-2014/168629 A1 | 10/2014 |
| WO | WO-2015/030698 A1 | 3/2015 |
| WO | WO-2015/138736 A1 | 9/2015 |
| WO | WO-2015/138752 A1 | 9/2015 |
| WO | WO-2015/138771 A1 | 9/2015 |
| WO | WO-2015/197217 | 12/2015 |
| WO | WO-2016/102003 | 6/2016 |

OTHER PUBLICATIONS

Cohen-Tanugi, "Nanoporous graphene as a water desalination membrane," (Ph.D. Thesis, Massachusetts Institute of Technology) (Jun. 2015).

US Notice of Allowance in U.S. Appl. No. 14/610,770 mailed Aug. 12, 2016.

US Office Action in U.S. Appl. No. 14/656,190 mailed Aug. 29, 2016.

US Office Action for U.S. Appl. No. 14/656,580 dated Jun. 2, 2016.

US Office Action in U.S. Appl. No. 14/819,273 mailed Jul. 6, 2016.

US Office Action for U.S. Appl. No. 14/856,198 dated Jun. 3, 2016.

Yoon, "Simulations show how to turn graphene's defects into assets," ScienceDaily (Oct. 4, 2016), www.sciencedaily.com/releases/2016/10/161004120428.htm.

Zhang et al. Modern Thin-Film Technology 284-285 (Metallurgical Industry Press, 1st ed. 2009) (English translation not readily available).

Adiga et al., "Nanoporous Materials for Biomedical Devices," JOM 60: 26-32 (Mar. 25, 2008).

Allen et al., "Craters on silicon surfaces created by gas cluster ion impacts," Journal of Applied Physics, 92(7): 3671-8 (Oct. 2002).

AMI Applied Membranes Inc. (undated). FilmTec Nanofiltration Membrane Elements. Retrieved Jun. 1, 2016, from http://www.appliedmembranes.com/filmtec-nanofiltration-membrane-elements.html.

Apel, "Track etching technique in membrane technology," Radiation Measurements 34(1-6): 559-566 (Jun. 2001).

Atmeh et al., "Albumin Aggregates: Hydrodynamic Shape and Physico-Chemical Properties," Jordan Journal of Chemistry, 2(2): 169-182 (2007).

Bae et al., "Roll-to-roll production of 30-inch graphene films for transparent electrodes," Nature Nanotechnology 5: 574-578 (Jun. 20, 2010).

Bai et al., "Graphene nanomesh," Nature Nanotechnology 5: 190-194 (Feb. 14, 2010).

Baker. (2004). "Track-etch Membranes." In Membrane Technology and Applications (2nd ed., pp. 92-94). West Sussex, England: John Wiley & Sons.

Butler et al. "Progress, Challenges, and Opportunities in Two-Dimensional Materials Beyond Graphene", Materials Review 7(4): 2898-2926 (Mar. 6, 2013).

(56) References Cited

OTHER PUBLICATIONS

Chen et al., "Mechanically Strong, Electrically Conductive, and Biocompatible Graphene Paper," Adv. Mater., 20(18): 3557-3561 (Sep. 2008) (available online Jul. 2008).

Chhowalla et al., "The chemistry of two-dimensional layered transition metal dichalcogenide nanosheets," Nature Chemistry 5: 263-275 (Mar. 20, 2013).

Childres et al., "Effect of oxygen plasma etching on graphene studied using Raman spectroscopy and electronic transport measurements," New Journal of Physics 13 (Feb. 10, 2011).

Clochard. (undated). Radiografted track-etched polymer membranes for research and application [Scholarly project]. In Laboratoire Des Solides Irradiés. Retrieved Jun. 2, 2016, from http://iramis.cea.fr/radiolyse/5juin2015/Clochard.pdf.

Cohen-Tanugi et al, "Water Desalination across Nanoporous Graphene," ACS Nano Letters 12(7): 3602-3608 (Jun. 5, 2012).

Colton, "Implantable biohybrid artificial organs," Cell Transplantation 4(4): 415-436 (Jul.-Aug. 1995).

Desai et al., "Nanoporous microsystems for islet cell replacement," Advanced Drug Delivery Reviews 56: 1661-1673 (Jul. 23, 2004).

Dong et al., "Growth of large-sized graphene thin-films by liquid precursor-based chemical vapor deposition under atmospheric pressure," Carbon 49(11): 3672-3678 (May 2011).

Fischbein et al., "Electron beam nanosculpting of suspended graphene sheets," Applied Physics Letters 93(113107): 1-3, (Sep. 16, 2008).

Fissell et al., "High-Performance Silicon Nanopore Hemofiltration Membranes," NIH-PA Author Manuscript, PMC, (Jan. 5, 2010), also published in J. Memb. Sci. 326(1): 58-63 (Jan. 5, 2009).

Fuertes et al., "Carbon composite membranes from Matrimid® and Kapton® polyimides for gas separation," Microporous and Mesoporous Materials, 33: 115-125 (Dec. 1999).

Galashev, "Computer study of the removal of Cu from the graphene surface using Ar clusters," Computational Materials Science, 98:123-128 (Feb. 2015) (available online Nov. 2014).

Gimi et al., "A Nanoporous, Transparent Microcontainer for Encapsulated Islet Therapy," J. Diabetes Sci. Tech. 3(2): 1-7 (Mar. 2009).

Hong et al., "Graphene multilayers as gates for multi-week sequential release of proteins from surfaces," NIH-PA Author Manuscript PMC (Jun. 1, 2014), also published in ACS Nano, Jan. 24, 2012; 6(1): 81-88 (first published online Dec. 29, 2011).

Hu et al., "Enabling graphene oxide nanosheets as water separation membranes," Environmental Science & Technology 47(8): 3715-3723 (Mar. 14, 2013).

International Search Report and Written Opinion in PCT/US2015/013599 mailed Jul. 20, 2015.

International Search Report and Written Opinion in PCT/US2015/013805 mailed Apr. 30, 2015.

International Search Report and Written Opinion in PCT/US2015/018114 mailed Jun. 3, 2015.

International Search Report and Written Opinion in PCT/US2015/020246 mailed Jun. 10, 2015.

International Search Report and Written Opinion in PCT/US2015/020296 mailed Jun. 17, 2015.

International Search Report and Written Opinion in PCT/US2015/028948 mailed Jul. 16, 2015.

International Search Report and Written Opinion in PCT/US2015/029932 mailed Oct. 6, 2015.

International Search Report and Written Opinion in PCT/US2016/027607 mailed Jul. 22, 2016.

International Search Report and Written Opinion in PCT/US2016/027616 mailed Jul. 22, 2016.

International Search Report and Written Opinion in PCT/US2016/027596 mailed Jul. 22, 2016.

International Search Report and Written Opinion in PCT/US2016/027603 mailed Jul. 22, 2016.

International Search Report and Written Opinion in PCT/US2016/027610 mailed Jul. 22, 2016.

International Search Report and Written Opinion in PCT/US2016/027612 mailed Jul. 22, 2016.

International Search Report and Written Opinion in PCT/US2016/027637 mailed Jun. 22, 2016.

International Search Report in PCT/US15/20201 mailed Jun. 10, 2015.

International Search Report in PCT/US2015/048205 mailed Dec. 4, 2015.

Inui et al., "Molecular dynamics simulations of nanopore processing in a graphene sheet by using gas cluster ion beam," Appl. Phys. A, 98: 787-794 (Mar. 2010) (available online Dec. 2009).

Jiang et al., "Porous Graphene as the Ultimate Membrane for Gas Separation," Nano Letters 9(12): 4019-4024 (Sep. 23, 2009).

Joshi et al., "Precise and ultrafast molecular sieving through graphene oxide membranes", Science 343(6172): 752-754 (Feb. 14, 2014).

Kanani et al., "Permeability—Selectivity Analysis for Ultrafiltration: Effect of Pore Geometry," NIH-PA Author Manuscript, PMC, (Mar. 1, 2011), also published in J. Memb. Sci. 349(1-2): 405 (Mar. 1, 2010).

Karan et al., "Ultrafast Viscous Permeation of Organic Solvents Through Diamond-Like Carbon Nanosheets," Science 335: 444-447 (Jan. 27, 2012).

Kim et al., "Fabrication and Characterization of Large Area, Semiconducting Nanoperforated Graphene Materials," Nano Letters 10(4): 1125-1131 (Mar. 1, 2010).

Kim et al., "The structural and electrical evolution of graphene by oxygen plasma-induced disorder," Nanotechnology IOP 20(375703): 1-8 (Aug. 26, 2009).

Koh et al., "Sensitive NMR Sensors Detect Antibodies to Influenza," NIH PA Author Manuscript PMC (Apr. 2009), also published in Angew. Chem. Int'l. Ed. Engl, 47(22): 4119-4121 (May 2008) (available online Apr. 2008).

Koski and Cui, "The New Skinny in Two-Dimensional Nanomaterials", ACS Nano 7(5): 3739-3743 (May 16, 2013).

Kurapati et al., "Graphene oxide based multilayer capsules with unique permeability properties: facile encapsulation of multiple drugs," Chemical Communication 48: 6013-6015 (Apr. 25, 2012).

Lehtinen et al., "Cutting and controlled modification of graphene with ion beams," Nanotechnology, 22: 175306 (8 pages) (Mar. 2011).

Li et al., "3D graphene oxide-polymer hydrogel: near-infrared light-triggered active scaffold for reversible cell capture and on-demand release," Advanced Materials 25: 6737-6743 (Oct. 7, 2013).

Liu et al., "Atomically Thin Molybdenum Disulfide Nanopores with High Sensitivity for DNA Translocation," ACS Nano 8(3): 2504-2511 (Feb. 18, 2014).

Liu et al., "Graphene Oxidation: Thickness-Dependent Etching and Strong Chemical Doping," Nano Letters 8(7): 1965-1970 (Jun. 19, 2008).

Marquardt et al., "Hybrid materials of platinum nanoparticles and thiol-functionalized graphene derivatives," Carbon 66: 285-294 (Jan. 2014; first published online Sep. 12, 2013).

Matteucci et al., "Chapter 1: Transport of gases and Vapors in Glass and Rubbery Polymers," in Materials Science of Membranes for Gas and Vapor Separation (Yampolskii et al eds. 2006) (available online Jun. 2006).

Mishra et al., "Functionalized Graphene Sheets for Arsenic Removal and Desalination of Sea Water," Desalination 282: 39-45 (Nov. 1, 2011).

Morse, "Scalable Synthesis of Semiconducting Nanopatterned Graphene Materials," InterNano Resources for Nanomanufacturing (undated). Retrieved Jun. 2, 2016 from: http://www.internano.org/node/345.

Nair et al., "Unimpeded Permeation of Water Through Helium-Leak-tight Graphene-Based Membranes," Science 335: 442-444 (Jan. 27, 2012).

Nam et al., "Monodispersed PtCo nanoparticles on hexadecyltrimethylammonium bromide treated graphene as an effective oxygen reduction reaction catalyst for proton exchange membrane fuel cells," Carbon 50: 3739-3747 (Aug. 2012) (available online Apr. 2012).

Nandamuri et al., "Chemical vapor deposition of graphene films," Nanotechnology 21(14): 1-4 (Mar. 10, 2010).

(56) References Cited

OTHER PUBLICATIONS

Nayini et al., "Synthesis and characterization of functionalized carbon nanotubes with different wetting behaviors and their influence on the wetting properties of carbon nanotubes/polymethylmethacrylate coatings," Progress in Organic Coatings, 77(6): 1007-1014 (Jun. 2014) (available online Mar. 2014).
O'Hern et al. "Selective Molecular Transport through Intrinsic Defects in a Single Layer of CVD Graphene," ACS Nano, 6(11): 10130-10138 (Oct. 2, 2012).
O'Hern et al., "Selective Ionic Transport through Tunable Subnanometer Pores in Single-Layer Graphene Membranes," Nano Letters 14(3): 1234-1241 (Feb. 3, 2014).
O'Hern, "Development of process to transfer large areas of LPCVD graphene from copper foil to a porous support substrate," 1-62 (M.S. Thesis, Massachusetts Institute of Technology) (Sep. 2011).
Paul, "Creating New Types of Carbon-Based Membranes," Science 335: 413-414 (Jan. 27, 2012).
Plant et al., "Size-dependent propagation of Au nanoclusters through few-layer graphene," Nanoscale, 6: 1258-1263 (2014) (available online Oct. 2013).
Popok. "Cluster Ion Implantation in Graphite and Diamond: Radiation Damage and Stopping of Cluster Constituents," Reviews on Advanced Materials Science 38(1): 7-16 (2014).
Russo et al., "Atom-by-atom nucleation and growth of graphene nanopores," PNAS, 109(16): 5953-5957 (Apr. 2012).
Schweicher et al., "Membranes to achieve immunoprotection of transplanted islets," NIH-PA Author Manuscript, PMC, (Nov. 13, 2014), also published in Frontiers in Bioscience (Landmark Ed) 19: 49-76 (Jan. 1, 2014).
Sint et al., "Selective Ion Passage through Functionalized Graphene Nanopores," JACS 130: 16448-16449 (Nov. 14, 2008).
Suk et al., "Water Transport Through Ultrathin Graphene," Journal of Physical Chemistry Letters 1(10): 1590-1594 (Apr. 30, 2010).
Sun et al., "Growth of graphene from solid carbon sources," Nature 468(7323): 549-552 (Nov. 25, 2010; including corrigendum in Nature 471(7336): 124 (Mar. 2011).
Tan et al., "Beta-cell regeneration and differentiation: how close are we to the 'holy grail'?" J. Mol. Encodrinol. 53(3): R119-R129 (Dec. 1, 2014).
Tang et al., "Highly wrinkled cross-linked graphene oxide membranes for biological and charge-storage applications," Small 8(3): 423-431 (Feb. 6, 2012; first published online Dec. 13, 2011).
Vlassiouk et al., "Versatile ultrathin nanoporous silicon nitride membranes," Proc. Natl. Acad. Sci. USA 106(50): 21039-21044 (Dec. 15, 2009).
Wadvalla, "Boosting agriculture through seawater," Nature Middle East (Jul. 2, 2012). Retrieved Jun. 1, 2016 from: natureasia.com/en/nmiddleeast/article/10.1038/nmiddleeast.2012.92?WT.mc_id=FBK NatureMEast].
Wikipedia, "Ion track." Jun. 1, 2016. Retrieved Jun. 1, 2016 from: en.wikipedia.org/wiki/ion_track.
Xu et al., "Graphene-like Two-Dimensional Materials", Chemical Reviews 113: 3766-3798 (Jan. 3, 2013).
Zabihi et al., "Formation of nanopore in a suspended graphene sheet with argon cluster bombardment: A molecular dynamics simulation study," Nuclear Instruments and Methods in Physics Research B, 343: 48-51 (Jan. 2015) (available online Nov. 2014).
Zan et al., "Graphene Reknits Its Holes," Nano Lett. 12(8): 3936-3940 (Jul. 5, 2012).
Zhao et al. "Two-Dimensional Material Membranes: An Emerging Platform for Controllable Mass Transport Applications," Small 10(22): 4521-4542 (Sep. 10, 2014).
Zhao et al., "Drilling Nanopores in Graphene with Clusters: A Molecular Dynamics Study," J. Phys. Chem. C, 116(21): 11776-1178 (2012) (available online May 2012).
Zhao et al., "Effect of SiO2 substrate on the irradiation-assisted manipulation of supported graphene: a molecular dynamics study," Nanotechnology, 23(28):1-8 (Jul. 2012) (available online Jun. 2012).
Notice of Allowance for U.S. Appl. No. 14/819,273 dated Oct. 28, 2016.
US Office Action for U.S. Appl. No. 14/193,007 dated Oct. 21, 2016.
US Office Action for U.S. Appl. No. 14/193,007 dated Dec. 21, 2015.
US Office Action for U.S. Appl. No. 14/193,007 dated Jul. 1, 2016.
Barreiro et al. "Understanding the catalyst-free transformation of amorphous carbon into graphene by current-induced annealing," Scientific Reports, 3 (Article 1115): 1-6 (Jan. 2013).
Botari et al., "Graphene healing mechanisms: A theoretical investigation," Carbon, 99: 302-309 (Apr. 2016) (published online Dec. 2015).
Chen et al., "Defect Scattering in Graphene," Physical Review Letters, 102: 236805-1-236805-4 (Jun. 2009).
Chen et al., "Self-healing of defected graphene," Applied Physics Letters, 102(10): 103107-1-103107-5 (Mar. 2013).
Cheng et al., "Ion Transport in Complex Layered Graphene-Based Membranes with Tuneable Interlayer Spacing," Science Advances, 2(2): e1501272 (9 pages) (Feb. 2016).
Crock et al., "Polymer Nanocomposites with Graphene-Based Hierarchical Fillers as Materials for Multifunctional Water Treatment Membranes," Water Research, 47(12): 3984-3996 (Aug. 2013) (published online Mar. 2013).
Han et al., "Ultrathin Graphene Nanofiltration Membrane for Water Purification," Advanced Functional Materials, 23(29): 3693-3700 (Aug. 2013).
International Search Report and Written Opinion in PCT/US2016/027583 mailed Jan. 13, 2017.
Written Opinion in PCT/US2016/027590 mailed Jan. 6, 2017.
International Search Report and Written Opinion in PCT/US2016/027594 mailed Jan. 13, 2017.
International Search Report and Written Opinion in PCT/US2016/027628 mailed Jan. 9, 2017.
International Search Report and Written Opinion in PCT/US2016/027631 mailed Jan. 13, 2017.
International Search Report and Written Opinion in PCT/US2016/027632 mailed Jan. 9, 2017.
Written Opinion in PCT/US2016/052010 mailed Dec. 20, 2016.
International Search Report in PCT/US2016/027629 mailed Dec. 8, 2016.
International Search Report in PCT/US2016/052007 mailed Dec. 27, 2016.
Kjeldsen, T., "Yeast secretory expression of insulin precursors," Appl Microbiol Biotechnol, 54: 277-286 (May 2000).
Lin et al., "A Direct and Polymer-Free Method for Transferring Graphene Grown by Chemical Vapor Deposition to Any Substrate," ACSNANO, 8(2): 1784-1791 (Jan. 2014).
Liu et al. "Synthesis of high-quality monolayer and bilayer graphene on copper using chemical vapor deposition," Carbon, 49(13): 4122-4130 (Nov. 2011) (published online May 2011).
O'Hern et al., "Nanofiltration across defect-sealed nanoporous monolayer graphene," Nano Letters, 15(5): 3254-3260 (Apr. 2015).
US Corrected Notice of Allowance in U.S. Appl. No. 13/480,569 mailed May 26, 2015.
US Notice of Allowance for U.S. Appl. No. 14/610,770 dated Apr. 25, 2016.
US Notice of Allowance in U.S. Appl. No. 14/819,273 mailed Dec. 14, 2016.
US Notice of Allowance in U.S. Appl. No. 13/480,569 mailed Feb. 27, 2015.
US Office Action in U.S. Appl. No. 13/480,569 mailed Jul. 30, 2014.
US Office Action in U.S. Appl. No. 14/856,471 mailed Dec. 1, 2016.
US Restriction Requirement in U.S. Appl. No. 14/193,007 mailed Jul. 17, 2015.
Wang et al., "Graphene Oxide Membranes with Tunable Permeability due to Embedded Carbon Dots," Chemical Communications, 50(86): 13089-13092 (Nov. 2014) (published online Sep. 2014).
Xu et al., "Graphene Oxide-TiO$_2$ Composite Filtration Membranes and their Potential Application for Water Purification," Carbon, 62: 465-471 (Oct. 2013) (published online Jun. 2013).

(56) References Cited

OTHER PUBLICATIONS

Zhao et al., "A glucose-responsive controlled release of insulin system based on enzyme multilayers-coated mesoporous silica particles," Chem. Commun., 47: 9459-9461 (Jun. 2011).
US Notice of Allowance in U.S. Appl. No. 14/610,770 mailed Jan. 23, 2017.
US Notice of Allowance in U.S. Appl. No. 14/856,198 mailed Feb. 10, 2017.
US Notice of Allowance in U.S. Appl. No. 14/856,198 mailed Mar. 1, 2017.
US Office Action in U.S. Appl. No. 14/609,325 mailed Feb. 16, 2017.
US Office Action in U.S. Appl. No. 14/193,007 mailed Mar. 23, 2017.
US Office Action in U.S. Appl. No. 14/843,944 mailed Jan. 6, 2017.
US Office Action in U.S. Appl. No. 15/099,464 mailed Mar. 10, 2017.
US Corrected Notice of Allowance in U.S. Appl. No. 14/819,273 mailed Apr. 12, 2017.
AE Search and Examination Report for United Arab Emirates Application No. P186/13 dated Oct. 4, 2016.
Agenor et al., "Renal tubular dysfunction in human visceral leishmaniasis (Kala-azar)," Clinical Nephrology 71(5): 492-500 (May 2009) (available online Mar. 21, 2011).
Albert et al., "Ringer's lactate is compatible with the rapid infusion of AS-3 preserved packed red blood cells," Can. J. Anaesth. 56(5): 352-356 (May 2009) (available online Apr. 2, 2009).
Aluru et al. "Modeling electronics on the nanoscale." Handbook of nanoscience, engineering and technology Goddard W, Brenner D, Lyshevski S, lafrate GJ (2002): 11-1.
Alvarenga, "Carbon nanotube materials for aerospace wiring" Rochester Institute of Technology, 2010.
AMI Applied Membranes Inc., "Filmtec Nanofiltration Membrane Elements", Retrieved from appliedmembranes.com/nanofiltration_elements.htm, accessed Apr. 28, 2015 (2 Pages).
ASO et al., "Comparison of serum high-molecular weight (HMW) adiponectin with total adiponectin concentrations in type 2 diabetic patients with coronary artery using a novel enzyme-linked immunosorbent assay to detect HMW adiponectin," Diabetes 55(7): 1954-1960 (Jul. 2006).
AU Examination Report for Australian Patent Application No. 2013235234, dated Jan. 13, 2017, 4 pages.
AU Examination Report for Australian Patent Application No. 2013363283, dated Jun. 20, 2017, 4 pages.
AU Notice of Acceptance for Australian Application No. 2011293742 dated Jan. 13, 2016.
Axelsson et al., "Acute hyperglycemia induces rapid, reversible increases in glomerular permeability in nondiabetic rats," AM. J. Physiol. Renal Physiol. 298(6): F1306-F1312 (Jun. 2010) (available online Mar. 17, 2010).
Bains et al., "Novel lectins from rhizomes of two Acorus species with mitogenic activity and inhibitory potential towards murine cancer cell lines," Intl Immunopharmacol. 5(9): 1470-1478 (Aug. 2005) (available online May 12, 2005).
Baker, "Membrane Technology and Applications", Membrane Technology and Applications; Apr. 14, 2004; pp. 92-94.
Barreiro et al. "Transport properties of graphene in the high-current limit." Physical review letters 103.7 (2009): 076601.
Bazargani et al. "Low molecular weight heparin improves peritoneal ultrafiltration and blocks complement and coagulation," Peritoneal Dialysis Int'l 25(4): 394-404 (Jul. 2005-Aug. 2005).
Bazargani, "Acute inflammation in peritoneal dialysis: experimental studies in rats. Characterization of regulatory mechanisms," Swedish Dental J. Supp. 171: 1-57, i (2005).
Beppu et al., "Antidiabetic effects of dietary administration of Aloe arborescens Miller components on multiple low-dose streptozotocin-induced diabetes in mice: investigation on hypoglycemic action and systemic absorption dynamics of aloe components," J. Ethnopharmacol. 103(3): 468-77 (Feb. 20, 2006) (available online Jan. 6, 2006).

Bieri et al. "Two-dimensional Polymer Formation on Surfaces: Insight into the Roles of Precursor Mobility and Reactivity" JACS, 2010, vol. 132, pp. 16669-16676.
Bruin et al., "Maturation and function of human embryonic stem cell-derived pancreatic progenitors in macroencapsulation devices following transplant into mice", Diabetologia (2013), vol. 56: 1987-1998 (Jun. 16, 2013).
Chu Ju, et al. "Modern Biotechnology" East China University of Technology Press, (Sep. 2007), vol. 1; pp. 306-307, ISBN 978-7-5628-2116-8.
Clochard, "Track-Etched Polymer Membranes," Laboratory of Irradiated Solids, Ecole Polytechnique, retrieved from http://www.lsi.polytechnique.fr/home/research/physics-and-chemistry-of-nano-objects/trac . . ., Accessed Jul. 30, 2015 (2 pages).
CN Notification of Grant for Chinese Application No. 201180049184.5 dated Jun. 6, 2016.
CN Office Action for Chinese Application No. 201380014845.X dated Jul. 8, 2016.
CN Office Action for Chinese Application No. 201380014845.X dated Sep. 2, 2015.
CN Office Action for Chinese Application No. 201380019165.5 dated Aug. 25, 2015.
CN Office Action for Chinese Application No. 201380073141.X dated Jun. 8, 2016.
CN Office Action for Chinese Application No. 201380073141.X dated Mar. 21, 2017.
CN Office Action for Chinese Application No. 201480015372.X dated Aug. 2, 2016.
CN Office Action for Chinese Application No. 20118004918.5 dated Jun. 15, 2015.
CN Office Action for Chinese Application No. 201180049184.5 dated Jul. 30, 2014.
CN Office Action for Chinese Application No. 201180049184.5 dated Mar. 4, 2016.
CN Office Action for Chinese Application No. 201380014845.X dated Dec. 23, 2016.
CN Office Action for Chinese Application No. 201380017644.5 dated Feb. 7, 2017.
CN Office Action for Chinese Application No. 201380017644.5 dated May 26, 2016.
CN Office Action for Chinese Application No. 201380017644.5 dated Sep. 29, 2015.
CN Office Action in Chinese Application No. 201380013988.9 dated Oct. 27, 2015.
Daniel et al. "Implantable Diagnostic Device for Cancer Monitoring." Biosens Bioelectricon. 24(11): 3252-3257 (Jul. 15, 2009).
Database WPI, Week 201238, Thomson Scientific, London, GB; AN 2012-D49442. No date.
De Lannoy et al., "Aquatic Biofouling Prevention by Electrically Charged Nanocomposite Polymer Thin Film Membranes", 2013 American Water Work Association membrane Technology Conference; Environmental science & technology 47.6 (2013): 2760-2768.
Deng et al., "Renal protection in chronic kidney disease: hypoxia-inducible factor activation vs. angiotensin II blockade," Am. J. Physiol. Renal Physiol. 299(6): F1365-F1373 (Dec. 2010) (available online Sep. 29, 2010).
Edwards, "Large Sheets of Graphene Film Produced for Transparent Electrodes (w/ Video)"; (Jun. 21, 2010), PhysOrg.com, retrieved on May 15, 2017 from https://phys.org/news/2010-06-large-sheets-graphene-transparentelectrodes.html (2 pages).
EP Office Action for European Application No. 13715529.7 dated Jun. 24, 2016.
Fayerman, "Canadian scientists use stem cells to reverse diabetes in mice", The Telegraph-Journal (New Brunswick), 1-2 (Jun. 29, 2012).
Fayerman, "Diabetes reversed in mice; University of B.C. scientists use embryonic stem cells to deal with Type 1 disease", The Vancouver Sun (British Columbia), 1-2 (Jun. 28, 2012).
Fejes et al. "A review of the properties and CVD synthesis of coiled carbon nanotubes." Materials 3.4 (2010): 2618-2642.

(56) References Cited

OTHER PUBLICATIONS

Franzen, C. "MIT Setting Up Industrial-Scale Graphene Printing Press" Sep. 23, 2011, retrieved from http://talkingpointsmemo.com/idealab/mit-setting-up-industrial-scale-graphene-printing-press (2 pages).
Freedman et al., "Genetic basis of nondiabetic end-stage renal disease," Semin. Nephrol. 30(2): 101-110 (Mar. 2010).
Garcia-Lopez et al., "Determination of high and low molecular weight molecules of icodextrin in plasma and dialysate, using gel filtration chromatography, in peritoneal dialysis patients," Peritoneal Dialysis Int'l 25(2): 181-191 (Mar. 2005-Apr. 2005).
Georgakilas et al., "Functionalization of Graphene: Covalent and Non-Covalent Approaches, Derivatives and Applications," Chem. Rev., (2012) 112(11), pp. 6156-6214.
Gnudi "Molecular mechanisms of proteinuria in diabetes," Biochem. Soc. Trans. 36(5): 946-949 (Oct. 2008).
Gotloib et al., "Peritoneal dialysis in refractory end-stage congestive heart failure: a challenge facing a no-win situation," Nephrol. Dialysis. Transplant. 20(Supp. 7): vii32-vii36 (Jul. 2005).
Harvey "Carbon as conductor: a pragmatic view." Proceedings of the 61st IWCS Conference, http://www.iwcs.org/archives/56333-iwcs-2012b-1.1584632. vol. 1. 2012.
Hashimoto et al. "Direct evidence for atomic defects in graphene layers." Nature 430.7002 (2004): 870-873.
He, et al. "The attachment of Fe3 O4 nanoparticles to graphene oxide by covalent bonding." Carbon 48.11 (2010): 3139-3144.
Hone et al. "Graphene has record-breaking strength" Physicsworld.com, Jul. 17, 2008.
Huang et al., "Gene expression profile in circulating mononuclear cells afterexposure to ultrafine carbon particles," Inhalation Toxicol. 22(10): 835-846 (Aug. 2010).
Humplik, et al. "Nanostructured materials for water desalination." Nanotechnology 22.29 (2011): 292001.
International Search Report and Written Opinion dated Jan. 5, 2012 for related International Application No. PCT/US11/47800.
International Search Report and Written Opinion dated Jul. 5, 2017 from related PCT application PCT/US2017/024147.
International Search Report and Written Opinion dated Mar. 12, 2014 for International Application No. PCT/US2013/074942.
International Search Report and Written Opinion for International Application No. PCT/US2011/047800 dated Jan. 5, 2012.
International Search Report and Written Opinion for PCT Application No. PCT/US2014/023027 dated Jun. 26, 2014.
International Search Report and Written Opinion in International Application No. PCT/US2013/030344 dated Jun. 19, 2013.
International Search Report and Written Opinion in International Application No. PCT/US2013/033035 dated Jun. 28, 2013.
International Search Report and Written Opinion in International Application No. PCT/US2013/033400, dated Jun. 28, 2013.
International Search Report and Written Opinion in International Application No. PCT/US2013/033403 dated Jun. 28, 2013.
International Search Report and Written Opinion in PCT/US2014/041766, dated Sep. 30, 2014.
International Search Report and Written Opinion dated Jun. 5, 2014 in International Application No. PCT/US2014/021677.
International Search Report and Written Opinion dated Jun. 6, 2014 in International Application No. PCT/US2014/023043.
International Search Report and Written Opinion dated Dec. 16, 2014, for International Application No. PCT/US2014/051011.
International Search Report and Written Opinion dated Jun. 19, 2015, in International Application No. PCT/US2015/020287.
Inui et al. "Molecular dynamics simulations of nanopore processing in a graphene sheet by using gas cluster ion beam." Applied Physics A: Materials Science & Processing 98.4 (2010): 787-794.
Israelachvili, "Intermolecular and Surface Forces," 3rd ed., Chap. 7.1, Sizes of Atoms, Molecules, and Ions, 2011, 1 page.
Jiao et al., "Castration differentially alters basal and leucine-stimulated tissue protein synthesis in skeletal muscle and adipose tissue," Am. J. Physiol. Endocrinol. Metab. 297(5): E1222-1232 (Nov. 2009) (available online Sep. 15, 2009).

JP Office Action in Japanese Application No. 2015-501729 dated Dec. 9, 2016 (English translation).
JP Office Action in Japanese Application No. 2015-501729 dated Jun. 20, 2017 (English translation).
JP Office Action in Japanese Application No. 2015-501867 dated Oct. 11, 2016 (English translation).
JP Office Action in Japanese Application No. 2015-503405 dated Nov. 14, 2016 (English translation).
JP Office Action in Japanese Application No. 2015-503406 dated Dec. 6, 2016(English translation).
JP Office Action in Japanese Application No. 2015-549508 dated Jun. 27, 2017 (English translation).
Kang et al., "Effect of eplerenone, enalapril and their combination treatment on diabetic nephropathy in type 11 diabetic rats," Nephrol. Dialysis Transplant. 24(1): 73-84 (Jan. 2009).
Kang et al., "Efficient Transfer of Large-Area Graphene Films onto Rigid Substrates by Hot Pressing," American Chemical Society Nano, 6(6): 5360-5365(May 28, 2012).
Kar et al., "Effect of glycation of hemoglobin on its interaction with trifluoperazine," Protein J. 25(3): 202-211 (Apr. 2006) (available online Jun. 6, 2006).
Kawamoto et al., "Serum high molecular weight adiponectin is associated with mild renal dysfunction in Japanese adults," J. Atherosclerosis Thrombosis 17(11): 1141-1148 (Nov. 27, 2011).
Khun et al. "From Microporous Regular Frameworks to Mesoporous Materials with Ultrahigh Surface Area: Dynamic reorganization of Porous Polvmer Networks" JACS, 2008; vol. 130; pgs. 13333-13337.
Krupka et al., "Measurements of the Sheet Resistance and Conductivity of Thin Epitaxial Graphene and SiC Films" Applied Physics Letters 96, 082101-I; Feb. 23, 2010.
Kumar et al., "Modulation of alpha-crystallin chaperone activity in diabetic rat lens by curcumin," Molecular Vision 11: 561-568 (Jul. 26, 2005).
Lathuiliere et al., "Encapsulated Cellular Implants for Recombinant Protein Delivery and Therapeutic Modulation of the Immune System," Journal of Applied Physics, Int. J. Mol. Sci., 16: 10578-10600 (May 8, 2015).
Lee, et al. "Measurement of the elastic properties and intrinsic strength of monolayer graphene." science 321.5887 (2008): 385-388.
Li, R.H. "Materials for immunoisolated cell transplantation". Adv. Drug Deliv. Rev. 33, 87-109 (1998).
Lucchese et al. "Quantifying ion-induced defects and Raman relaxation length in graphene." Carbon 48.5 (2010): 1592-1597.
Macleod et al. "Supramolecular Orderinng in Oligothiophene-Fullerene Monolayers" JACS, 2009, vol. 131, pgs. 16844-16850.
Mattevi et al. "A review of chemical vapour deposition of graphene on copper." Journal of Materials Chemistry 21.10 (2011): 3324-3334.
Miao et al. "Chemical vapor deposition of grapheme" INTECH Open Access Publisher, 2011.
MIT/MTL Center for Graphene Devices and 2D Systems, retrieved from: http://www-mtl.mit.edu/wpmu/graphene/ [retrieved from Aug. 21, 2014 archive] (3 pages).
MIT/MTL Center for Graphene Devices and 2D Systems, retrieved from: http://www-mtl.mit.edu/wpmu/graphene/ [retrieved from Mar. 4, 2015 archive] (3 pages).
Nafea, et al. "Immunoisolating semi-permeable membranes for cell encapsulation: focus on hydrogels." J Control Release. 154(2): 110-122 (Sep. 5, 2011).
Nezlin, "Circulating non-immune IgG complexes in health and disease," Immunol. Lett. 122(2); 141-144 (Feb. 21, 2009) (available online Feb. 2, 2009).
Norata et al., "Plasma adiponectin levels in chronic kidney disease patients: relation with molecular inflammatory profile and metabolic status," Nutr. Metab. Cardiovasc. Dis. 20(1): 56-63 (Jan. 2010) (available online Apr. 9, 2009).
Ogawa et al., "Exosome-like vesicles in Gloydius blomhoffii blomhoffii venom," Toxicon 51(6): 984-993 (May 2008) (available online Feb. 19, 2008).

(56) References Cited

OTHER PUBLICATIONS

Ohgawara et al. "Assessment of pore size of semipermeable membrane for immunoisolation on xenoimplatntation of pancreatic B cells using a diffusion chamber." Transplant Proc. (6): 3319-3320. 1995.
Oki et al., "Combined acromegaly and subclinical Cushing disease related to high-molecular-weight adrenocorticotropic hormone," J. Neurosurg. 110(2): 369-73 (Feb. 2009).
Osorio et al., "Effect of treatment with Iosartan on salt sensitivity and SGLT2 expression in hypertensive diabetic rats," Diabetes Res. Clin. Pract. 86(3): e46-e49 (Dec. 2009) (available online Oct. 2, 2009).
Osorio et al., "Effect of phlorizin on SGLT2 expression in the kidney of diabetic rats," J. Nephrol. 23(5): 541-546 (Sep.-Oct. 2010).
Padidela et al., "Elevated basal and post-feed glucagon-like peptide 1 (GLP-1) concentrations in the neonatal period," Eur. J. Endocrinol. 160(1): 53-58 (Jan. 2009) (available online Oct. 24, 2008).
Pall Corporation, "Pall Water Processing Disc-Tube Filter Technology", Retrieved on Feb. 10, 2015, Retrieved from http://www.pall.com/pdfs/Fuels-and-Chemicals/Disc-Tube_Filter_Technology-DT100b.pdF (15 pages).
Plant et al. "Size-dependent propagation of Au nanoclusters through few-layer grapheme," The Royal Society of Chemistry 2013, Nanoscale.
Pollard, "Growing Graphene via Chemical Vapor" Department of Physics, Pomona College; May 2, 2011.
Rafael et al. "Cell Transplantation and Immunoisolation: Studies on a macroencapsultaion device." From the Departments of Transplantation Pathology: Stockholm, Sweden (1999).
Rezania et al., "Enrichment of Human Embryonic Stem Cell-Derived NKX6.1-Expressing Pancreatic Progenitor Cells Accelerates the Maturation of Insulin-Secreting Cells in Vivo", Stem Cells Regenerative Medicine, vol. 31: 2432-2442 (Jul. 29, 2013).
Rezania et al., "Maturation of Human Embryonic Stem Cell-Derived Pancreatic Progenitors Into Functional Islets Capable of Treating Pre-existing Diabetes in Mice", Diabetes Journal, vol. 61: 2016-2029 (Aug. 1, 2012).
Ribeiro et al., "Binary Mutual Diffusion Coefficients of Aqueous Solutions of Sucrose, Lactose, Glucose, and Fructose in the Temperature Range from (298.15 to 328.15) K," J. Chem. Eng. Data 51(5): 1836-1840 (Sep. 2006) (available online Jul. 20, 2006).
Rippe et al., "Size and charge selectivity of the glomerular filter in early experimental diabetes in rats," Am. J. Physiol. Renal Physiol. 293(5): F1533-F1538 (Nov. 2007)(available online Aug. 15, 2007).
SA Final Rejection for Saudi Arabia Application No. 113340400 dated Jan. 28, 2016.
SA First Examination Report for Saudi Arabia Application No. 113340401 dated Apr. 28, 2015.
SA First Examination Report for Saudi Arabia Application No. 113340424 dated May 10, 2015.
SA First Examination Report for Saudi Arabia Application No. 113340426 dated May 12, 2015.
SA First Examination Report in Saudi Arabia Application No. 113340400 dated Apr. 13, 2015.
SA Second Examination Report for Saudi Arabia Application No. 113340400 dated Aug. 11, 2015.
Sanchez, et al. "Biological Interactions of Graphene-Family Nanomaterials——An Interdisciplinary Review." Chem Res Toxicol. 25(1): 15-34 (Jan. 13, 2012).
Schweitzer, Handbook of Separation Techniques for Chemical Engineers, 1979, McGraw-Hill Book Company, pp. 2-5 to 2-8.
Sethna et al., "Serum adiponectin levels and ambulatory blood pressure monitoring in pediatric renal transplant recipients," Transplantation 88(8): 1030-1037 (Oct. 27, 2009).
Sullivan et al., "Microarray analysis reveals novel gene expression changes associated with erectile dysfunction in diabetic rats," Physiol. Genom. 23(2): 192-205 (Oct. 17, 2005) (available online Aug. 23, 2005).
Swett et al, "Imagining and Sculpting Graphene on the atomic scale" Oak Ridge National Laboratory's (ORNL) Center for Nanophase Materials Sciences (CNMS) Biannual Review. 1 page. No date.
Swett et al, "Supersonic Nanoparticle Interaction with Suspended CVD Graphene", Microsc. Microanal. 22 (Suppl 3): 1670-1671 (Jul. 25, 2016).
Takata et al., "Hyperresistinemia is associated with coexistence of hypertension and type 2 diabetes," Hypertension 51. 2 (Feb. 2008): 534-9.
Tamborlane et al., "Continuous Glucose Monitoring and Intensive Treatment of Type 1 Diabets" N Engl J Med 359;14: 1464-1476 (Oct. 2, 2008).
Tanugi et al., "Nanoporous Graphene Could Outperform Best Commercial Water Desalination Techniques," ; ACS 2012; Jun. 25, 2012; Weftec 2012; Sep. 29-Oct. 3.
Totani et al. "Gluten binds cytotoxic compounds generated in heated frying oil." Journal of oleo science 57.12 (2008): 683-690.
Tsukamoto et al. "Purification, characterization and biological activities of a garlic oliqosaccharide," Journal of UOEH 30.2 (Jun. 1, 2008): 147-57.
TW Office Action in Taiwanese Application No. 102146079 dated Apr. 14, 2017. 9 pages.(English translation).
TW Search Report in Taiwanese Application No. 102146079 dated Apr. 14, 2017. 1 page.
UMEA Universitet "Graphene nanoscrolls are formed by decoration of magnetic nanoparticles." ScienceDaily. Aug. 15, 2013. https://www.sciencedaily.com/releases/2013/08/130815084402.htm (3 pages).
US Notice of Allowance for U.S. Appl. No. 12/868,150 dated Sep. 25, 2012.
US Notice of Allowance for U.S. Appl. No. 13/548,539 dated Aug. 18, 2015.
US Notice of Allowance for U.S. Appl. No. 13/548,539 dated Jul. 23, 2015.
US Notice of Allowance for U.S. Appl. No. 13/719,579 dated May 20 ,2016.
US Notice of Allowance for U.S. Appl. No. 13/795276 dated Oct. 7, 2016.
US Notice of Allowance for U.S. Appl. No. 13/802,896 dated Apr. 1, 2015.
US Notice of Allowance for U.S. Appl. No. 13/803,958 dated Aug. 29, 2016.
US Notice of Allowance for U.S. Appl. No. 13/803,958 dated Jun. 2, 2016.
US Notice of Allowance for U.S. Appl. No. 13/803,958 dated Sep. 12, 2016.
US Notice of Allowance for U.S. Appl. No. 13/804,085 dated Jan. 15, 2015.
US Notice of Allowance for U.S. Appl. No. 13/804,085 dated Mar. 12, 2015.
US Notice of Allowance for U.S. Appl. No. 13/923,503 dated Oct. 14, 2016.
US Notice of Allowance for U.S. Appl. No. 13/923,503 dated Oct. 5, 2016.
US Notice of Allowance for U.S. Appl. No. 14/200,195 dated Jul. 5, 2016.
US Notice of Allowance for U.S. Appl. No. 14/200,530 dated Aug. 1, 2016.
US Notice of Allowance for U.S. Appl. No. 14/203,655 dated Dec. 9, 2016.
US Notice of Allowance in U.S. Appl. No. 12/868,150 dated Sep. 25, 2012.
US Notice of Allowance in U.S. Appl. No. 13/795,276 dated Jan. 19, 2017.
US Notice of Allowance in U.S. Appl. No. 13/803,958 dated Aug. 29, 2016.
US Notice of Allowance in U.S. Appl. No. 13/803,958 dated Sep. 12, 2016.
US Notice of Allowance in U.S. Appl. No. 14/610,770 dated May 5, 2017.
US Notice of Allowance in U.S. Appl. No. 14/819,273 dated Jun. 9, 2017.

(56) References Cited

OTHER PUBLICATIONS

US Notice of Allowance in U.S. Appl. No. 15/099,464 dated Jun. 16, 2017.
US Office Action for U.S. Appl. No. 13/548,539 dated Feb. 6, 2015.
US Office Action for U.S. Appl. No. 13/719,579 dated Jul. 8, 2015.
US Office Action for U.S. Appl. No. 13/719,579 dated May 4, 2016.
US Office Action for U.S. Appl. No. 13/795,276 dated Apr. 22, 2016.
US Office Action for U.S. Appl. No. 13/795,276 dated Oct. 6, 2015.
US Office Action for U.S. Appl. No. 13/802,896 dated Sep. 24, 2014.
US Office Action for U.S. Appl. No. 13/803,958 dated Aug. 11, 2014.
US Office Action for U.S. Appl. No. 13/803,958 dated May 28, 2015.
US Office Action for U.S. Appl. No. 13/803,958 dated Nov. 18, 2015.
US Office Action for U.S. Appl. No. 13/923,503 dated Mar. 22, 2016.
US Office Action for U.S. Appl. No. 14/031,300 dated Jan. 20, 2016.
US Office Action for U.S. Appl. No. 14/031,300 dated Jul. 7, 2015.
US Office Action for U.S. Appl. No. 14/200,195 dated Mar. 21, 2016.
US Office Action for U.S. Appl. No. 14/200,195 dated Nov. 4, 2015.
US Office Action for U.S. Appl. No. 14/200,530 dated Feb. 29, 2016.
US Office Action for U.S. Appl. No. 14/203,655 dated Aug. 10, 2016.
US Office Action for U.S. Appl. No. 14/656,190 dated May 18, 2017.
US Office Action for U.S. Appl. No. 14/656,657 dated Jul. 7, 2017.
US Office Action for U.S. Appl. No. 14/686,452 dated Jun. 9, 2017.
US Office Action for U.S. Appl. No. 14/843,944 dated Jun. 23, 2017.
US Office Action for U.S. Appl. No. 14/856,471 dated May 31, 2017.
US Office Action for U.S. Appl. No. 14/858,741 dated Dec. 1, 2016.
US Office Action for U.S. Appl. No. 15/099,193 dated Jul. 19, 2017.
US Office Action for U.S. Appl. No. 15/289,944 dated Feb. 9, 2017.
US Office Action for U.S. Appl. No. 15/289,944 dated Jul. 13, 2017.
US Office Action for U.S. Appl. No. 15/336,545 dated Dec. 19, 2016.
US Office Action for U.S. Appl. No. 15/453,441 dated Jun. 5, 2017.
US Office Action in U.S. Appl. No. 14/193,007 dated Apr. 24, 2017.
US Office Action in U.S. Appl. No. 14/656,617 dated Apr. 4, 2017.
US Office Action on U.S. Appl. No. 14/656,335 dated Apr. 25, 2017.
US Office Action on U.S. Appl. No. 15/332,982 dated Jan. 30, 2017.
US Supplemental Notice of Allowance for U.S. Appl. No. 13/795276 dated Nov. 29, 2016.
Vallon,"Micropuncturing the nephron," Pflugers Archiv : European journal of physiology 458. 1 (May 2009): 189-201.
Van Der Zande et al. "Large-scale arrays of single-layer graphene resonators." Nano letters 10.12 (2010): 4869-4873.
Verdonck, P., "Plasma Etching", in Oficina de Microfabricao: Projeto e Construcao de CI's MOS, Swart, J.W., Ed., Campinas (Sao Paulo, Brazil): UNICAMP, 2006, ch. 10, p. 9.
Vlassiouk et al. "Large scale atmospheric pressure chemical vapor deposition of graphene." Carbon 54 (2013): 58-67.
Vriens et al. "Methodological considerations in quantification of oncological FDG PET studies." European journal of nuclear medicine and molecular imaging 37.7 (2010): 1408-1425.
Wang et al., "Direct Observation of a Long-Lived Single-Atom Catalyst Chiseling Atomic Structures in Graphene," Nano Lett., 2014, pp. A-F.
Wang et al., "Porous Nanocarbons: Molecular Filtration and Electronics," Advances in Graphene Science, Edited by Mahmood Aliofkhazraei, (2013) ISBN 978-953-51/1182-5, Publisher: InTech; Chapter 6, pp. 119-160.
Wang et al.,"What is the role of the second "structural " NADP--binding site in human glucose 6-phosphate dehydrogenase?,"Protein science a publication of the Protein Society 17. 8 (Aug. 2008): 1403-11.
Wei et al., "Synthesis of N-doped graphene by chemical vapor deposition and its electrical properties", Nano Lett. 2009 9 1752-58.
Xiaogan Liang et al., Formation of Bandgap and Subbands in Graphene Nanomeshes with Sub-10nm Ribbon Width Fabricated via Nanoimprint Lithography., Nano Letters, Jun. 11, 2010, pp. 24542460.
Xie et al., "Fractionation and characterization of biologically-active polysaccharides from Artemisia tripartite," Phytochemistry 69. 6 (Apr. 2008): 1359-71.
Xie, et al. "Controlled fabrication of high-quality carbon nanoscrolls from monolayer graphene." Nano letters 9.7 (2009): 2565-2570.
Yagil et al. "Nonproteinuric diabetes-associated nephropathy in the Cohen rat model of type 2 diabetes" Diabetes 54. 5 (May 2005): 1487-96.
Zan et al. "Interaction of Metals with Suspended Graphene Observed by Transmission Electron Microscopy", J. Phys. Chem. Lett., Mar. 8, 2012, 3, 953-958.
Zhang et al. "Effect of Chemical Oxidation on the Structure of Single-Walled Carbon Nanotubes", J. Phys. Chem., Feb. 12, 2003, B 107 3712-8.
Zhang et al. "Method for anisotropic etching of graphite or graphene" Institute of Physics, Chinese Academy of Sciences; Peop. Rep. China; Mar. 30, 2011.
Zhang et al. "Production of Graphene Sheets by Direct Dispersion with Aromatic Healing Agents", Small, May 6, 2010, vol. 6, No. 10, 1100-1107.
Zhang et al. "Isolation and activity of an alpha-amylase inhibitor from white kidney beans," Yao xue xue bao =Acta pharmaceutica Sinica 42. 12 (Dec. 2007): 1282-7.
Zhao, et al. "Efficient preparation of large-area graphene oxide sheets for transparent conductive films." ACS nano 4.9 (2010): 5245-5252.
Zhou, K., et al., "One-pot preparation of graphene/ Fe3O4 composites by a solvothermal reaction," New J. Chem., 2010, 34, 2950.
Zhu et al. "Carbon Nanotubes in Biomedicine and Biosensing", Carbon Nanotubes-Growth and Applications, InTech, (Aug. 9, 2011) Chapter 6: pp. 135-162. Available from: https://www.intechopen.com/books/carbon-nanotubes-growth-and-applications/carbon-nanotubes-in-biomedicine-and-biosensing.
Ziegelmeier et al. "Adipokines influencing metabolic and cardiovascular disease are differentially regulated in maintenance hemodialysis," Metabolism: clinical and experimental 57. 10 (Oct. 2008): 1414-21.
Zirk et al. "A refractometry-based glucose analysis of body fluids," Medical engineering & physics 29. 4 (May 2007): 449-58.
Zyga "Nanoporous Graphene Could Outperform Best Commercial Water Desalination Techniques," Phys.org., Jun. 22, 2012, Retrieved from http://www.phys.org/pdf259579929.pdf [Last Accessed Dec. 3, 2014] (3 pages).
U.S. Appl. No. 14/193,007, dated Feb. 28, 2014.
U.S. Appl. No. 14/856,471, dated Sep. 16, 2015.
U.S. Appl. No. 15/099,295, dated Apr. 14, 2016.
U.S. Appl. No. 15/099,410, dated Apr. 14, 2016.
U.S. Appl. No. 15/099,420, dated Apr. 14, 2016.
U.S. Appl. No. 15/099,289, dated Apr. 14, 2016.
U.S. Appl. No. 15/099,447, dated Apr. 14, 2016.
U.S. Appl. No. 15/099,269, dated Apr. 14, 2016.
U.S. Appl. No. 15/099,239, dated Apr. 14, 2016.
U.S. Appl. No. 15/099,464, dated Apr. 14, 2016.
U.S. Appl. No. 15/099,276, dated Apr. 14, 2016.
U.S. Appl. No. 15/099,482, dated Apr. 14, 2016.
U.S. Appl. No. 15/099,056, dated Apr. 14, 2016.
U.S. Appl. No. 15/099,099, dated Apr. 14, 2016.
U.S. Appl. No. 14/656,190, dated Mar. 12, 2015.
U.S. Appl. No. 15/099,304, dated Apr. 14, 2016.
U.S. Appl. No. 15/099,588, dated Apr. 14, 2016.
U.S. Appl. No. 14/707,808, dated May 8, 2015.
U.S. Appl. No. 14/819,273, dated Aug. 5, 2015.

(56) References Cited

OTHER PUBLICATIONS

U.S. Appl. No. 14/856,198, dated Sep. 16, 2015.
U.S. Appl. No. 14/754,531, dated Jun. 29, 2015.
U.S. Appl. No. 14/610,770, dated Jan. 30, 2015.
U.S. Appl. No. 14/656,657, dated Mar. 12, 2015.
U.S. Appl. No. 14/609,325, dated Jan. 29, 2015.
U.S. Appl. No. 14/656,580, dated Mar. 12, 2015.
U.S. Appl. No. 13/480,569, dated May 25, 2012.
PCT Application PCT/US2015/028948, dated May 1, 2015.
PCT Application PCT/US2015/018114, dated Feb. 27, 2015.
U.S. Appl. No. 14/843,944, dated Sep. 2, 2015.
U.S. Appl. No. 15/099,193, dated Apr. 14, 2016.
U.S. Appl. No. 15/308,351, dated Nov. 1, 2016.
U.S. Appl. No. 13/422,753, dated Mar. 16, 2012.
U.S. Appl. No. 13/795,276, dated Mar. 12, 2013.
U.S. Appl. No. 13/804,085, dated Mar. 14, 2013.
U.S. Appl. No. 13/803,958, dated Mar. 14, 2013.
U.S. Appl. No. 13/802,896, dated Mar. 14, 2013.
U.S. Appl. No. 13/779,963, dated Feb. 28, 2013.
U.S. Appl. No. 15/289,944, dated Oct. 10, 2016.
U.S. Appl. No. 14/192,796, dated Feb. 27, 2014.
U.S. Appl. No. 14/200,195, dated Mar. 7, 2014.
U.S. Appl. No. 14/200,530, dated Mar. 7, 2014.
U.S. Appl. No. 14/195,802, dated Mar. 3, 2014.
U.S. Appl. No. 14/858,741, dated Sep. 18, 2015.
U.S. Appl. No. 15/336,545, dated Oct. 27, 2016.
U.S. Appl. No. 14/971,922, dated Dec. 16, 2015.
U.S. Appl. No. 14/686,452, dated Apr. 14, 2015.
U.S. Appl. No. 15/332,982, dated Oct. 24, 2016.
U.S. Appl. No. 13/719,579, dated Dec. 19, 2012.
U.S. Appl. No. 12/868,150, dated Aug. 25, 2010.
U.S. Appl. No. 13/548,539, dated Jul. 13, 2012.
U.S. Appl. No. 14/031,300, dated Sep. 19, 2013.
U.S. Appl. No. 15/410,457, dated Jan. 19, 2017.
U.S. Appl. No. 14/656,335, dated Mar. 12, 2015.
U.S. Appl. No. 14/656,617, dated Mar. 12, 2015.
U.S. Appl. No. 15/589,135, dated May 8, 2017.
CN Office Action in Chinese Application No. 201580006829.5 dated Aug. 1, 2017. (English translation) (8 pages).
EP Office Action for European Application No. 15743307.9 dated Aug. 8, 2017. (17 pages).
European Search Report dated Aug. 28, 2017 from related EP application 15743750.0. (7 pages).
International Search Report and Written Opinion dated Aug. 14, 2017 from related PCT application PCT/US2017/031537. (12 pages).
Jiang, L. et al., Design of advanced porous grapheme materials: from grapheme nanomesh to 3D architectures. Nanoscale, Oct. 16, 2013, vol. 6, pp. 1922-1945.
JP Office Action in Japanese Application No. 2015-503405 dated Jun. 28, 2017. (English translation) (6 pages).
Search Report and Written Opinion dated Aug. 14, 2017 for Singapore Application No. 11201606287V. (10 pages).
Search Report and Written Opinion dated Aug. 22, 2017 for Singapore Application No. 11201607584P. (7 pages).
Sears et al., "Recent Developments in Carbon Nanotube Membranes for Water Purification and Gas Separation" Materials, vol. 3 (Jan. 4, 2010), pp. 127-149.
US Notice of Allowance in U.S. Appl. No. 14/193,007 dated Sep. 6, 2017. (9 pages).
US Notice of Allowance in U.S. Appl. No. 14/610,770 dated Sep. 26, 2017. (12 pages).
US Notice of Allowance in U.S. Appl. No. 15/332,982 dated Sep. 21, 2017. (5 pages).
US Office Action for U.S. Appl. No. 14/609,325 dated Aug. 25, 2017. (7 pages).
US Office Action for U.S. Appl. No. 15/332,982 dated Aug. 18, 2017. (9 pages).
EPO Extended Search Report for European Application No. 171684883.5 dated Jul. 25, 2017 (8 pages).
EPO Supplementary Search Report for European Application No. 15762019.6 dated Aug. 9, 2017 (16 pages).
US Office Action in U.S. Appl. No. 15/099,099 dated Oct. 5, 2017 (11 pages).
US Office Action in U.S. Appl. No. 15/099,447 dated Oct. 3, 2017 (21 pages).
Weisen, et al., "Fabrication of nanopores in a graphene sheet with heavy ions: A molecular dynamics study", Journal of Applied Physics 114, 234304 (2013), pp. 234304-1 to 234304-6.

\* cited by examiner

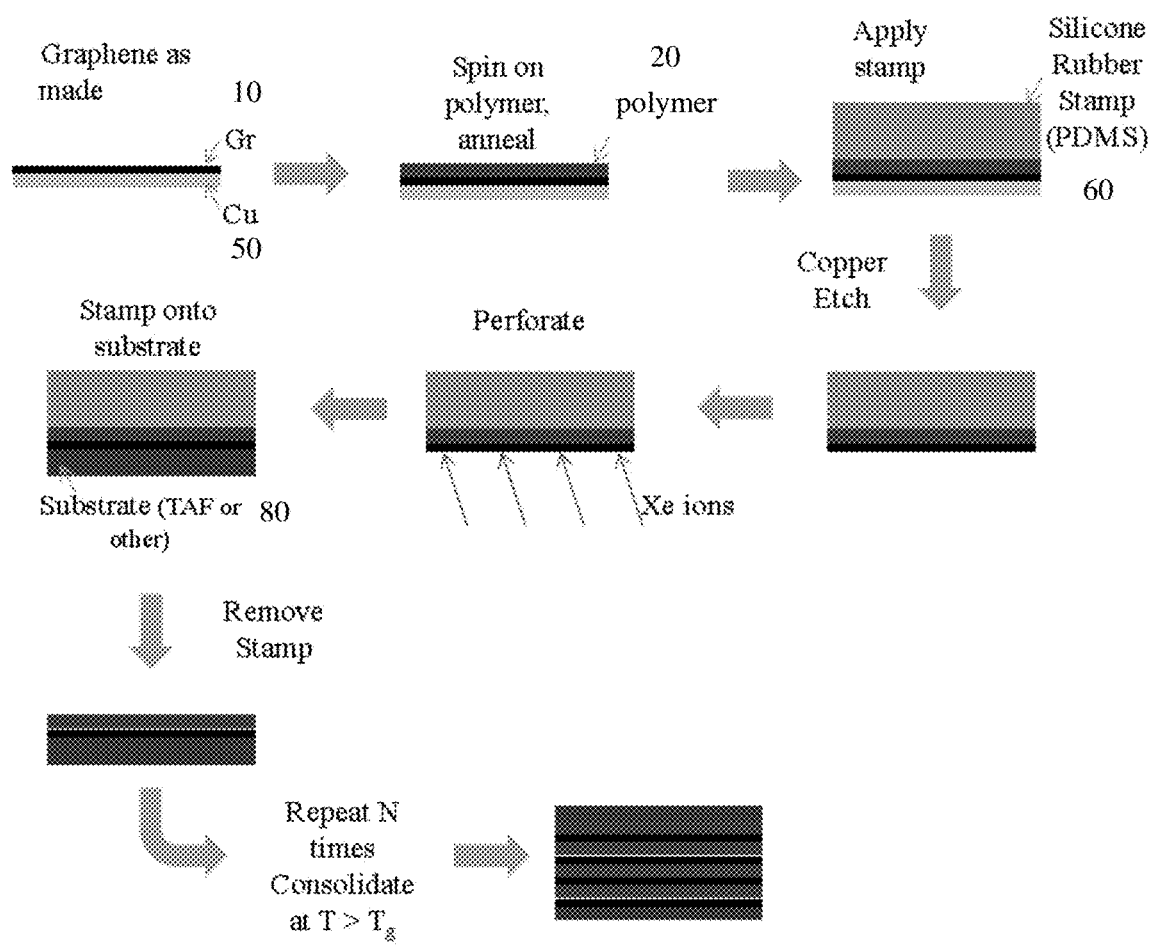

SEPARATION MEMBRANES FORMED FROM PERFORATED GRAPHENE AND METHODS FOR USE THEREOF

CROSS-REFERENCE TO RELATED APPLICATIONS

This application claims the benefit of priority under 35 U.S.C. §119 of U.S. Provisional Application 61/951,930, filed Mar. 12, 2014, which is hereby incorporated by reference in its entirety.

STATEMENT REGARDING FEDERALLY SPONSORED RESEARCH OR DEVELOPMENT

Not applicable.

FIELD

The present disclosure generally relates to separation processes, and, more specifically, to separation membranes containing graphene or other two dimensional materials and methods for use and fabrication thereof.

BACKGROUND

Gas species separation from mixtures represents an important industrial and economic process. In the natural gas production industry, for example, almost all raw (as-produced) natural gas is processed to remove various contaminants and non-valued gases before downstream utilization, such as introducing it as a product into a pipeline transportation system. For example, co-produced gases such as carbon dioxide and hydrogen sulfide, especially in combination with water, can heavily impact the value of as-produced natural gas. Production of unconventional gas sources such as shale plays and coal beds is increasing and driving a need for more efficient and affordable processing systems at more remote sites and with higher contaminant gas level processing capabilities. Contaminants in other types of gases can also be problematic and can impact their valuation, as well as the applicability of various industrial processes. For example, $CO_2$ and contaminant capture from industrial flue gas, hydrogen purification and recovery processes, syngas production, and fuel cells represent non-limiting areas that can benefit from gas separation technology.

Separation membranes are commonly used for gas separation processes in a variety of industrial settings, including speciation of natural gas. Gas separation membranes are attractive for use in gas phase separation processes because they generally possess no or few moving parts, require low maintenance, exhibit low energy consumption, and possess exceptional reliability. However, many conventional membranes are not highly efficient, can be chemically unstable in certain instances, and do not compete well with bulk separation processes (non-membrane). For example, illustrative bulk carbon dioxide separation technologies can include cryogenic separation, pressure-temperature adsorption cycles, $CO_2$ capture with amines, and the like. $CO_2$ separation membranes, in contrast, can operate well at high $CO_2$ concentrations, but can be less effective at modest $H_2S$ concentrations. Nevertheless, with proper process design, membrane-based gas separation processes can be used to simplify overall process design and be more convenient for deployment in remote field locations.

Specialized polymer membranes have been developed for use in specific gas separation applications. Examples include cellulose acetate membranes for $CO_2$ separations in "sour gas" conditions, polyimide membranes, and polyamide membranes. Many different polymers are used in this regard, as different polymers have utility and affinity for use with different gas species, allowing certain gases to transit the membrane in preference to others. The transit mechanism can depend on specific interactions between gas and polymer molecules that affect gas dissolution and diffusion through the polymer. The polymer is generally chosen to enhance these interactions for the target gases and enhance the permeation rate of a desired gas over the permeation rate of an undesired gas. Generally, a membrane is considered to give an adequate separation of two gases from one another if the permeation ratio of the two gases is about 10:1 or above, although other permeation ratios can also be adequate depending on the intended application in which the gas will be used. Although widely used, existing polymer membranes can display inadequate performance for certain gas mixtures or not be applicable to certain types of process conditions. For example, chemical stability of the polymer membrane under certain process conditions can represent a concern.

In view of the foregoing, improved techniques for gas separation, particularly using membrane technology, would be of considerable benefit in the art. The present disclosure satisfies this need and provides related advantages as well.

SUMMARY

The present disclosure describes separation membranes containing at least one layer of a polymer and at least one layer of a perforated two-dimensional material, particularly perforated graphene. Methods for preparing the separation membranes can include stacking one or more layers of polymer and one or more layers of the two-dimensional material upon one another. The two-dimensional material can be perforated before or after being stacked with the polymer layers. In specific embodiments, the two-dimensional material is a graphene-based material such as a graphene-based sheet. In an embodiment, the at least one layer of polymer exhibits a selected permeability for a first elected gas with respect to one or more other gases. In specific embodiments, the at least one layer of polymer is non-porous or dense. In specific embodiments, the at least one layer of polymer exhibits permeance to one or more gases via one or more solution diffusion processes.

Separation processes using the separation membranes described herein can be accomplished by contacting a gas mixture with the separation membrane. In an embodiment, the gas mixture comprises a first and a second gas. By perforating the two-dimensional material, such as graphene, with perforations or apertures that are of a sufficient size to allow increased transit of a desired gas through the membrane over that of one or more undesired gases, or vice versa, separation of the gas mixture can take place. Separation of two or more species in a mixture includes at least a change in the ratio(s) (weight or molar ratio) of the two or more species in the gas mixture after passage of the mixture through a perforated two-dimensional material or through the composite separation membranes herein. It will be appreciated that separation of a desired gas component from an undesired component can be achieved by retarding passage of the undesired species with respect to the desired species or by retarding passage of the desired species with respect to the undesired species. Separation processes herein may include multiple passages of a given gas mixture through a given separation membrane or passage of a gas mixture through multiple separation membranes.

In an aspect, the invention provides separation membranes comprising at least one dense polymeric membrane and at least one layer of a perforated two dimensional material. The dense polymer membrane can operate normally by solution-diffusion processes, giving some initial separation of gas species. The filter of perforated two dimensional material (i.e., perforated graphene layers) can block or limit passage of molecules larger than the holes in the two dimensional material, while at the same time permitting passage of smaller molecules. Thus, the composite membrane can separate gas species by two complementary mechanisms: solution-diffusion at the polymer (i.e., molecule-polymer interaction) and molecule size sieving. In this regard, the two-dimensional sieve barrier can provide very high permeability contrast at a threshold molecular size, allowing high separation ratios based upon size to be realized (e.g., $CO_2$ compared to methane). If the hole-size density in the graphene layer is sufficiently high, the graphene layer can convey very little added resistance to permeation of small molecules. Accordingly, the higher selectivity provided by the graphene layer can allow for a much thinner polymer membrane to be used, compared to solely polymer-containing membranes.

The disclosure provides a composite membrane for separation of a first gas from a second gas; said separation membrane comprising: at least one dense polymeric membrane permeable to said first gas and at least one layer of a perforated two-dimensional material wherein said composite membrane is arranged to provide preferential transport of said first gas relative to said second gas through said at least one dense polymer membrane and said at least one layer of said perforated two-dimensional material. In embodiments, at least one of or each of the dense polymeric membranes is independently characterized by a permeability to said first gas greater or equal to than 1 Barrer ($7.5 \times 10^{-11}$ $cm^3$ $cm^{-2}$ $s^{-1}$ $kPa^{-1}$), 10 Barrer ($7.5 \times 10^{-10}$ $cm^3$ $cm^{-2}$ $s^{-1}$ $kPa^{-1}$) or 100 Barrer ($7.5 \times 10^{-9}$ $cm^3$ $cm^{-2}$ $s^{-1}$ $kPa^{-1}$). In embodiments, at least one of or each of the dense polymeric membranes is independently characterized by a permeability for said first gas is independ from 1 Barrer to 100,000 Barrer, from 10 Barrer to 100,000 Barrer or from 100 Barrer to 100,000 Barrer. In embodiments, the composite membrane is characterized by a net or overall permeability to said first gas greater or equal to than 1 Barrer ($7.5 \times 10^{-11}$ $cm^3$ $cm^{-2}$ $s^{-1}$ $kPa^{-1}$), 10 Barrer ($7.5 \times 10^{-10}$ $cm^3$ $cm^{-2}$ $s^{-1}$ $kPa^{-1}$) or 100 Barrer ($7.5 \times 10^{-9}$ $cm^3$ $cm^{-2}$ $s^{-1}$ $kPa^{-1}$). In embodiments, the net permeability of the composite membrane to said first gas is from 1 Barrer to 100,000 Barrer, from 10 Barrer to 100,000 Barrer or from 100 Barrer to 100,000 Barrer.

The separation selectivity or efficiency of the composite membrane may be taken as the ratio of the net permeability of the composite membrane to the first gas to the net permeability of the composite membrane to the second gas. In embodiments, the net separation selectivity of the composite membrane is greater than 10, greater than 2, greater than 50 or greater than 100.

In an aspect, the disclosure provides a composite membrane comprising at least one dense polymeric membrane and at least one layer of said perforated two-dimensional material, wherein the at least one dense polymeric membrane and at least one layer of said perforated two-dimensional material are provided in physical contact with each other or separated by one or more intermediate structures provided in physical contact with said at least one dense polymeric membrane and said at least one layer of said perforated two-dimensional material. In an embodiment, said at least one dense polymeric membrane and said at least one layer of said perforated two-dimensional material are provided in in a stacked multilayer geometry. In embodiments, said stacked multilayer geometry comprises 1 to 100 layers of dense polymeric membrane and 1 to 100 layers of said perforated two-dimensional material, 1 to 50 layers of said dense polymeric membrane and 1 to 50 layers of said perforated two-dimensional material, 1 to 25 layers of said dense polymeric membrane and 1 to 25 layers of said perforated two-dimensional material, 1 to 10 layers of said dense polymeric membrane and 1 to 10 layers of said perforated two-dimensional material or 1 to 5 layers of dense polymeric membrane and 1 to 5 layers of said perforated two-dimensional material. In an embodiment, said stacked multilayer geometry comprises at least one dense polymeric membrane positioned on an external surface of said composite membrane in physical contact with said first gas and said second gas. In an embodiment, each of said layers of said perforated two-dimensional material provided in said stacked multilayer geometry is independently positioned between first and second adjacent dense polymeric membranes. In an embodiment, said stacked multilayer geometry comprises a first dense polymeric membrane in physical contact with a first layer of said perforated two-dimensional material. In an embodiment, said stacked multilayer geometry further comprises a second dense polymeric membrane wherein said first layer of said perforated two-dimensional material is provided between, and in physical contact with, said first and second dense polymeric membranes. In an embodiment, said stacked multilayer geometry comprises a plurality of said dense polymeric membranes, wherein at least a portion of said dense polymeric membranes have a different chemical compositions, thicknesses or both. In an embodiment, said stacked multilayer geometry comprises a plurality of said layers of said perforated two-dimensional material, wherein at least a portion of said layers of said perforated two-dimensional material have a different chemical compositions, hole cross sectional dimensions, hole densities or any combination of these.

In an embodiment, each of said layers of a perforated two dimensional material independently provides separation of said first and second gases via a molecular sieving process. In an embodiment, each of said layers of perforated two-dimensional material is independently characterized by a ratio of a permeance for said first gas to a permeance for said second gas greater than or equal to 1000. In an embodiment, each of said layers of perforated two-dimensional material is independently characterized by a thickness selected from the range of 0.3 to 5 nm. In an embodiment, each of said layers of perforated two-dimensional material is independently characterized by a tensile strength greater than or equal to 50 MPa. In an embodiment, each of said layers of perforated two-dimensional material is independently characterized by a plurality of holes independently having cross sectional dimensions less than or equal to 15 angstroms, less than or equal to 10 angstroms, or less than or equal to 5 angstroms. In an embodiment, said plurality of holes independently have cross sectional dimensions selected over the range of 3 to 5 angstroms, 3 to 10 angstroms or 3 to 15 angstroms.

In an embodiment each of said layers of perforated two dimensional material independently comprises graphene, a graphene-based material, a transition metal dichalcogenide, molybdenum sulfide, α-boron nitride, silicene, germanene, or a combination thereof. In an embodiment, each of said layers of perforated two-dimensional material independently comprises a perforated graphene-based material. In an embodiment, said perforated graphene-based material comprises single-layer graphene or multi-layer graphene. In an embodiment, the perforated graphene-based material comprises 2 to 20 layers of graphene. In an embodiment, said perforated graphene-based material comprises at least 70% graphene. In an embodiment, said perforated graphene-based has a thickness selected from the range of 0.34 to 5 nm.

In an embodiment, the dense polymeric membrane is selected to provide a higher flux, permeance or permeability for one component of a feedstock mixture over another. In an embodiment, each of said dense polymeric membranes independently provides separation of said first gas and second gas via one or more solution diffusion processes. In an embodiment, each of said dense polymeric membranes is independently characterized by a ratio of the permeability for said first gas to the permeability for said second gas greater than or equal to 10. In an embodiment, each of the dense polymeric membranes is independently characterized by a porosity less than or equal to 1%.

In an embodiment, the dense polymeric membrane contacts the layer of two-dimensional material so that the primary gas transport occurs through the dense polymeric material and layer of two-dimensional material (rather than leakage from the membrane assembly at the interface between the layers). In an embodiment, the dense polymeric membrane is a homogeneous membrane. In embodiments, the thickness of each of the dense polymeric membranes is from less than or equal to 50 µm, from 0.1 µm to 50 µm, from 0.1 µm to 20 µm, 1.0 µm to 15 µm, 0.25 µm to 5 µm, or 5 µm to 10 µm.

Dense polymeric membranes for gas permeation include, but are not limited to, In an embodiment, said each of said dense polymeric membranes independently comprises a fluorocarbon, hydrocarbon, polysilicone, polyimide (PI), cellulose acetate (CA), polysulfone (PSf), polyethersulfone (PES), and polycarbonate (PC) or any combination of these. Polysilicone may also be referred to as silicone rubber. In embodiment, the dense polymeric membrane is selected from the group consisting of polyimide or cellulose acetate. In an embodiment, each of said dense polymeric membranes independently comprises a material selected from the group consisting of Teflon® AF, Sylgard® and any combination of these.

In an embodiment, each of said dense polymeric membranes is capable of exposure to a pressure of 50 psi, 100 psi, 500 psi, 1000 psi or 1500 psi or 2000 psi without undergoing mechanical failure. In an embodiment, each of said dense polymeric membranes is independently characterized by a tensile strength greater than or equal to 20 MPa. In embodiments, each of said dense polymeric membranes is capable of exposure to temperatures up to 300 K, 400 K, 500 K or 600 K without undergoing chemical or physical degradation. In embodiment, each said each of said dense polymeric membranes is independently characterized by a glass transition temperature greater than or equal to 300 K, 400 K, 500 K or 600 K. In an embodiment, each of said dense polymeric membranes is resistant to chemical reaction with $H_2O$, $CO_2$, $H_2S$, a hydrocarbon having from 1 to 9 carbon atoms or any combination of these. The hydrocarbon may be an alkane, an alkene, or an alkyne. In an embodiment, the hydrocarbon has the formula $C_nH_{2n+2}$, $C_nH_{2n}$, or $C_nH_{2n-2}$ where n is an integer from 1 to 9.

In an aspect, the disclosure provides a method for separating a first gas from a second gas; said method comprising the steps of:

providing a composite membrane comprising: at least one dense polymeric membrane permeable to said first gas and at least one layer of a perforated two-dimensional material; and contacting an external surface of said composite membrane with said first gas and said second gas; wherein said composite membrane provides preferential transport of said first gas relative to said second gas through said at least one dense polymer membrane and said at least one layer of perforated two-dimensional material, thereby separating said first gas from said second gas In embodiments, at least one of or each of the dense polymeric membranes is characterized by a permeability to said first gas greater or equal to than 1 Barrer ($7.5\times10^{-11}$ $cm^3$ $cm^{-2}$ $s^{-1}$ $kPa^{-1}$), 10 Barrer ($7.5\times10^{-10}$ $cm^3$ $cm^{-2}$ $s^{-1}$ $kPa^{-1}$) or 100 Barrer ($7.5\times cm^3$ $cm^2$ $kPa^{-1}$). In embodiments, the permeability of at least one of or each of the dense polymeric membranes to said first gas is from 1 Barrer to 100,000 Barrer, from 10 Barrer to 100,000 Barrer or from 100 Barrer to 100,000 Barrer. In embodiments, the composite membrane is characterized by a net or overall permeability to said first gas greater or equal to than 1 Barrer ($7.5\times10^{-11}$ $cm^3$ $cm^{-2}$ $s^{-1}$ $kPa^{-1}$), 10 Barrer ($7.5\times10^{-10}$ $cm^3$ $cm^{-2}$ $s^{-1}$ $kPa^{-1}$) or 100 Barrer ($7.5\times10^{-9}$ $cm^3$ $cm^{-2}$ $s^{-1}$ $kPa^{-1}$). In embodiments, the net permeability of the composite membrane to said first gas is from 1 Barrer to 100,000 Barrer, from 10 Barrer to 100,000 Barrer or from 100 Barrer to 100,000 Barrer.

In an embodiment, the disclosure provides a method of processing a feedstock gas, an exhaust gas, a revitalization gas or a commercial chemical product. In embodiments, the method is a method of processing a product or a byproduct produced in chemical refining or bioenergy production, a method of $N_2$ purification or $CO_2$ purification, a method of capture or sequestering of $CO_2$ or a method of revitalizing air. In an embodiment, said method is carried out a pressure at said external surface selected over the range of 15 PSI to 2000 PSI. In an embodiment, said method is carried out a temperature at said external surface selected over the range of 200 K to 600 K.

In a further embodiment, a method of processing natural gas by separation of methane from non-methane components is provided. In an embodiment, methane is separated from $CO_2$, $H_2O$, $H_2S$ or any combination of these. In an embodiment, methane is said second gas and said first gas is selected from the group consisting of $CO_2$, $H_2O$, H2S or any combination of these. In an embodiment, said processing is carried out at the source of said natural gas. In an embodiment, said natural gas is from a high-$CO_2$ gas field The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

The FIGURE shows a schematic of an illustrative graphene-based gas separation membrane of the present disclosure and an exemplary method for its fabrication.

DETAILED DESCRIPTION

A variety of two-dimensional materials useful in the present invention are known in the art. In various embodiments, the two-dimensional material comprises graphene, molybdenum sulfide, or boron nitride. In an embodiment, the two-dimensional material is a graphene-based material. In more particular embodiments, the two-dimensional material is graphene. Graphene according to the embodiments of the present disclosure can include single-layer graphene, multi-layer graphene, or any combination thereof. Other nanomaterials having an extended two-dimensional molecular structure can also constitute the two-dimensional material in the various embodiments of the present disclosure. For example, molybdenum sulfide is a representative chalcogenide having a two-dimensional molecular structure, and other various chalcogenides can constitute the two-dimensional material in the embodiments of the present disclosure. Choice of a suitable two-dimensional material for a particular application can be determined by a number of factors, including the chemical and physical environment into which the graphene or other two-dimensional material is to be terminally deployed.

In an embodiment, the two dimensional material useful in membranes herein is a sheet of graphene-based material. Graphene-based materials include, but are not limited to, single layer graphene, multilayer graphene or interconnected single or multilayer graphene domains and combinations thereof. In an embodiment, graphene-based materials also include materials which have been formed by stacking single or multilayer graphene sheets. In embodiments, multilayer graphene includes 2 to 20 layers, 2 to 10 layers or 2 to 5 layers. In embodiments, graphene is the dominant material in a graphene-based material. For example, a graphene-based material comprises at least 30% graphene, or at least 40% graphene, or at least 50% graphene, or at least 60% graphene, or at least 70% graphene, or at least 80% graphene, or at least 90% graphene, or at least 95% graphene. In embodiments, a graphene-based material comprises a range of graphene selected from 30% to 95%, or from 40% to 80% from 50% to 70%, from 60% to 95% or from 75% to 100%.

As used herein, a "domain" refers to a region of a material where atoms are uniformly ordered into a crystal lattice. A domain is uniform within its boundaries, but different from a neighboring region. For example, a single crystalline material has a single domain of ordered atoms. In an embodiment, at least some of the graphene domains are nanocrystals, having a domain size from 1 to 100 nm or 10-100 nm. In an embodiment, at least some of the graphene domains have a domain size greater than 100 nm to 1 micron, or from 200 nm to 800 nm, or from 300 nm to 500 nm. "Grain boundaries" formed by crystallographic defects at edges of each domain differentiate between neighboring crystal lattices. In some embodiments, a first crystal lattice may be rotated relative to a second crystal lattice, by rotation about an axis perpendicular to the plane of a sheet, such that the two lattices differ in "crystal lattice orientation".

In an embodiment, the sheet of graphene-based material comprises a sheet of single or multilayer graphene or a combination thereof. In an embodiment, the sheet of graphene-based material is a sheet of single or multilayer graphene or a combination thereof. In another embodiment, the sheet of graphene-based material is a sheet comprising a plurality of interconnected single or multilayer graphene domains. In an embodiment, the interconnected domains are covalently bonded together to form the sheet. When the domains in a sheet differ in crystal lattice orientation, the sheet is polycrystalline.

In embodiments, the thickness of the sheet of graphene-based material is from 0.34 to 10 nm, from 0.34 to 5 nm, or from 0.34 to 3 nm. In an embodiment, a sheet of graphene-based material comprises intrinsic defects. Intrinsic defects are those resulting from preparation of the graphene-based material in contrast to perforations which are selectively introduced into a sheet of graphene-based material or a sheet of graphene. Such intrinsic defects include, but are not limited to, lattice anomalies, pores, tears, cracks or wrinkles. Lattice anomalies can include, but are not limited to, carbon rings with other than 6 members (e.g. 5, 7 or 9 membered rings), vacancies, interstitial defects (including incorporation of non-carbon atoms in the lattice), and grain boundaries.

In an embodiment, membrane comprising the sheet of graphene-based material further comprises non-graphenic carbon-based material located on the surface of the sheet of graphene-based material. In an embodiment, the non-graphenic carbon-based material does not possess long range order and may be classified as amorphous. In embodiments, the non-graphenic carbon-based material further comprises elements other than carbon and/or hydrocarbons. Non-carbon elements which may be incorporated in the non-graphenic carbon include, but are not limited to, hydrogen, oxygen, silicon, copper and iron. In embodiments, the non-graphenic carbon-based material comprises hydrocarbons. In embodiments, carbon is the dominant material in non-graphenic carbon-based material. For example, a non-graphenic carbon-based material comprises at least 30% carbon, or at least 40% carbon, or at least 50% carbon, or at least 60% carbon, or at least 70% carbon, or at least 80% carbon, or at least 90% carbon, or at least 95% carbon. In embodiments, a non-graphenic carbon-based material comprises a range of carbon selected from 30% to 95%, or from 40% to 80%, or from 50% to 70%.

Two-dimensional materials in which pores are intentionally created are referred to herein as "perforated", such as "perforated graphene-based materials", "perforated two-dimensional materials' or "perforated graphene." Two-dimensional materials are, most generally, those which have atomically thin thickness from single-layer sub-nanometer thickness to a few nanometers and which generally have a high surface area. Two-dimensional materials include metal chalogenides (e.g., transition metal dichalogenides), transition metal oxides, hexagonal boron nitride, graphene, silicone and germanene (see: Xu et al. (2013) "Graphene-like Two-Dimensional Materials) Chemical Reviews 113:3766-3798).

Two-dimensional materials include graphene, a graphene-based material, a transition metal dichalcogenide, molybdenum sulfide, α-boron nitride, silicene, germanene, or a combination thereof. Other nanomaterials having an extended two-dimensional, planar molecular structure can also constitute the two-dimensional material in the various embodiments of the present disclosure. For example, molybdenum sulfide is a representative chalcogenide having a two-dimensional molecular structure, and other various chalcogenides can constitute the two-dimensional material in embodiments of the present disclosure. In another example, two-dimensional boron nitride can constitute the two-dimensional material in an embodiment of the invention. Choice of a suitable two-dimensional material for a particular application can be determined by a number of factors, including the chemical and physical environment into which the graphene, graphene-based or other two-dimensional material is to be deployed.

The technique used for forming the two-dimensional material, graphene or graphene-based material in the embodiments described herein is not believed to be particularly limited. For example, in some embodiments CVD graphene or graphene-based material can be used. In various embodiments, the CVD graphene or graphene-based material can be liberated from its growth substrate (e.g., Cu) and transferred to a polymer backing. Likewise, the techniques for introducing perforations to the graphene or graphene-based material are also not believed to be particularly limited, other than being chosen to produce perforations within a desired size range. Perforations are sized to provide desired selective permeability of a species (atom or molecule) for a given gas separation application. Selective permeability relates to the propensity of a porous material or a perforated two-dimensional material to allow passage (or transport) of one or more species more readily or faster than other species. Selective permeability allows separation of species which exhibit different passage or transport rates. In two-dimensional materials selective permeability correlates to the dimension or size (e.g., diameter) of apertures and the relative effective size of the species. Selective permeability of the perforations in two-dimensional materials such as graphene-based materials can also depend on functionalization of perforations (if any) and the specific species that are to be separated. Selective permeability of gases can also depend upon adsorption of a gas species on the filtration material, e.g., graphene. Adsorption at least in part can increase the local concentration of the gas species at the surface of the filtration material enhancing the rate of passage through the apertures. Separation of two or more species in a mixture includes a change in the ratio(s) (weight or molar ratio) of the two or more species in the mixture after passage of the mixture through a perforated two-dimensional material.

For example in applications for separation of gases, permeance is correlated with the size of a gas atom or molecule, for example as in kinetic diameters [see Marreucci et al. (2006) "Transport of gases and Vapors in Glass and Rubbery Polymers" in Materials Science of Membranes for Gas and Vapor Separation. (Eds. Yu et al.) John Wiley & Sons (New York).

The present disclosure is also directed, in part, to perforated graphene, perforated graphene-based materials and other perforated two-dimensional materials containing a plurality of apertures (or holes) ranging from about 3 to 15 angstroms in size. In a further embodiment, the hole size ranges from 3 to 10 angstroms or from 3 to 6 angstroms in size. The present disclosure is further directed, in part, to perforated graphene, perforated graphene-based materials and other perforated two-dimensional materials containing a plurality of holes ranging from about 3 to 15 angstrom in size and having a narrow size distribution, including but not limited to a 1-10% deviation in size or a 1-20% deviation in size. In an embodiment, the characteristic dimension of the holes is from about 3 to 15 angstroms in size. For circular holes, the characteristic dimension is the diameter of the hole. In embodiments relevant to non-circular pores, the characteristic dimension can be taken as the largest distance spanning the hole, the smallest distance spanning the hole, the average of the largest and smallest distance spanning the hole, or an equivalent diameter based on the in-plane area of the pore. As used herein, perforated graphene-based materials include materials in which non-carbon atoms have been incorporated at the edges of the pores.

The present disclosure is directed, in part, to methods for conducting gas separation using perforated graphene or another two dimensional material. The present disclosure is also directed, in part, to separation membranes formed from graphene or another two dimensional material. The present disclosure is also directed, in part, to methods for fabricating a separation membrane containing graphene or another two dimensional material.

Graphene has garnered widespread interest for use in a number of applications due to its favorable mechanical, thermal and electronic properties. Graphene represents an atomically thin layer of carbon in which the carbon atoms reside as closely spaced atoms at regular lattice positions. The regular lattice positions can have a plurality of defects present therein, which can occur natively or be intentionally introduced to the graphene basal plane. Such defects will also be equivalently referred to herein as "apertures," "perforations," or "holes." The term "perforated graphene" will be used herein to denote a graphene sheet with defects in its basal plane, regardless of whether the defects are natively present or intentionally produced. Aside from such apertures, graphene and other two-dimensional materials can represent an impermeable layer to many substances. Therefore, if they can be sized properly, the apertures in the impermeable layer can be useful for only allowing substances meeting certain size criteria through the impermeable layer.

In an embodiment, a dense polymeric membrane is substantially nonporous. In an embodiment, gas transport through a nonporous membrane occurs at least in part through a solution-diffusion mechanism. The present inventors recognized that the performance of polymer membranes could be improved by inserting a molecular sieve barrier into the polymer, specifically a molecular sieve barrier formed from graphene or a like two-dimensional material. In particular, the inventors recognized that perforated graphene could be used in a gas separation membrane to provide improved gas separation properties. Perforated graphene can be produced by any suitable technique, such as disclosed in commonly owned United States Patent Application Publication 2012/0048804, which is incorporated herein by reference in its entirety. In this regard, the extreme thinness of graphene reflects that molecular transport across the membrane can involve the least possible driving energy, and there are not believed to be distinct "dissolution" and "evaporation" steps involved during transport across its atomic lattice.

The use of graphene in gas separation processes can allow very selective separation processes to take place with various gases. For example, use of graphene in separating a mixture of $CO_2$ and methane can result in a selectivity ratio of about 10,000:1. By carefully choosing the perforation size within the graphene basal plane, graphene can allow complex gas mixtures to be separated that are not able to be efficiently handled using existing processes.

In addition to the foregoing benefits, permeation rates across the graphene can be "tuned" via specialized chemical functionalization of the graphene, such as along its edges, thereby providing an additional means of designing membranes for specific separation applications. Moreover, because the membranes described herein represent a layered structure with atomically thin layers of graphene embedded therein, the mass and footprint of the present membranes are not significantly different than existing polymeric membranes, while still achieving improved gas separation performance.

Further to the above, graphene-containing gas separation membranes can further offer reduced pressure sensitivity requirements, improved chemical inertness, and the opportunity to functionalize the surface of the graphene. Functionalization, in particular, can be used to tailor the graphene's performance during various separation operations.

In various embodiments, the gas separation membranes described herein can include one or more layers of a polymer and one or more layers of perforated graphene. Polymers suitable for use in the gas separation membranes can include those that are used in conventional gas separation membranes. The perforated graphene can be produced by any technique, known or presently unknown, used for introducing a plurality of holes in graphene. Suitable techniques can include plasma treatment, ion or other particle beams, chemical modifications, and the like. The holes in the graphene can be sized such that they render the graphene impermeable to gases that are larger than the hole size. In various embodiments, the perforations can range between about 0.2 nm to about 15 nm in size, from 3 to 15 angstroms in size, from 3 to 10 angstroms in size or from 3 to 6 angstroms in size.

Benefits that can be conveyed by the polymer in the gas separation membranes can include support of the graphene and conveyance of some gas separation properties in their own right. In illustrative embodiments, the polymer can include a fluorocarbon polymer, such as polytetrafluoroethylene, or a silicone polymer. In addition, the polymer can provide good tensile strength and good tensile elongation properties. Moreover, some polymers can be flexible as thin layers and exhibit high glass transition temperatures. All of these properties can be complementary to the graphene and its properties and support its combination therewith in forming a gas separation membrane.

Benefits that can be conveyed by the graphene in the gas separation membranes can include extreme molecular separation capabilities at high permeability. The extreme thinness of graphene (e.g., 0.3-3 nm) can enhance these features. Moreover, graphene exhibits high tensile strength (~106 GPa), excellent chemical stability, and thermal stability above 400° C. Again, the graphene properties can well complement those of the polymer in forming a gas separation membrane.

Several parameters are known in the art to characterize transport through membranes. As used herein, the flux ($J_i$) refers to the number of moles, volume or mass of a specified component i passing per unit time through a unit of membrane surface area normal to the thickness direction (SI Units: $m^3 \ m^{-2} \ s^{-1}$). As used herein, the permeance or pressure normalized flux refers to the transport flux per unit transmembrane driving force (SI Units: $m3 \ m^{-2} \ s^{-1} \ kPa^{-1}$. As used herein, the permeability refers to the transport flux per unit transmembrane driving force per unit membrane thickness ($P_i=J_i$/transmembrane driving force of component i SI Units: $m^3 \ m \ m^{-2} \ s^{-1} \ kPa^{-1}$). Other units for permeability include the Barrer, defined as 1 Barrer=$10^{-10} \ cm^3 \ cm \ cm^{-2} \ s^{-1} \ cmHg^{-1}$, which is equal to $7.5\times10^{-11} \ cm^3 \ cm \ cm^{-2} \ s^{-1} \ kPa^{-1}$. Techniques for measuring these parameters for conventional membranes are known to those skilled in the art.

The FIGURE shows a schematic of an illustrative graphene-based gas separation membrane of the present disclosure and an exemplary method for its fabrication. As shown, the graphene layer (10) is made on a layer of copper (50). A polymer layer (20) is then spun on the graphene layer (10) and annealed. A stamp (60) is applied to the polymer layer before the copper is removed through etching. The graphene layer is perforated and then transferred to a substrate (80). The stamp is then removed, producing the polymer and graphene layered upon one another on a substrate. Although the FIGURE shows perforation of the graphene with Xe ions, other perforation processes can be used. Moreover, the graphene can be perforated before or after being layered with the polymer.

Referring still to The FIGURE, a simple molding process can be used to embed large areas of graphene into polymer matrices, such as an exemplary siloxane (PDMS) rubber matrix. The rubber matrix can mechanically support and protect the graphene, while the graphene layer lends new separation capabilities to the composite membrane, as described above. Substantially impermeable membranes are also possible by embedding un-perforated graphene layers in a polymer stack.

The bulk polymer membrane can operate normally by solution-diffusion processes, giving some separation of gas species. The embedded graphene sieve filter (i.e., perforated graphene layers) can block or inhibit diffusion of molecules larger than the holes in the graphene, while at the same time permitting diffusion of smaller molecules. Thus, the composite membrane can separate gas species by two complementary mechanisms: solution-diffusion at the polymer (i.e., molecule-polymer interaction) and molecule size sieving. In this regard, the two-dimensional sieve barrier can provide very high permeability contrast at a threshold molecular size, allowing high separation ratios based upon size to be realized (e.g., $CO_2$ compared to methane). If the hole-size density in the graphene layer is sufficiently high, the graphene layer can convey very little added resistance to permeation of small molecules. Accordingly, the higher selectivity provided by the graphene layer can allow for a much thinner polymer membrane to be used, compared to solely polymer-containing membranes.

Due to the complementary solution-diffusion separation provided by the polymer, enhanced separation capabilities can be further realized. For example, when separating $H_2S$ from methane, $H_2S$ separation can take place in a silicone-rubber polymer (silicone-rubber has high affinity for separating $H_2S$) even if the graphene layer doesn't separate these species efficiently. With a proper selection of polymer type, polymer thickness, graphene hole size, graphene hole density, and graphene hole functionalization, composite membranes of this type can be designed that are capable of high selectivity across a wide range of molecular types while preserving or even enhancing overall separation efficiency (in terms of flux of separating species passing therethrough).

A membrane that can simultaneously handle both high $CO_2$ and $H_2S$ gas concentrations would extend the range of applications for membrane separations in natural gas processing. If such a membrane could simultaneously remove these gases from natural gas in a single process step, it would eliminate the need for separate cleaning processes for these contaminants, thereby reducing overall process costs and complexity. In this regard, various gas separation membranes described herein can be used in separating natural gas from various contaminant gases therein. The methods can include contacting as-produced or partially purified natural gas with the described separation membranes. Other gas mixtures can be purified in a like manner by appropriately sizing the holes in the graphene layer.

Other new functionalities are also possible by the foregoing composite membrane approach. For example, graphene is electrically conductive and can be built into a multi-layer composite stack with graphene layers separated by dielectric layers and electrically connected to a voltage source to enable capacitive charging between layers. Such an arrangement can be used to electrophoretically or dielectrophoretically control the movement of charged or polar particles between charged graphene electrode layers. If the graphene layers are perforated, the motion of molecules entering thorough graphene pores can be controlled between graphene layers by application of an appropriate voltage waveform to the graphene layers. Thus, molecular transport between graphene layers can be controllably retarded or enhanced in accordance with these embodiments. Such an arrangement can effectively represent a switchable membrane "gate" through which transport can be reduced or enhanced at will. Other versions are also possible for the case of uncharged or non-polar particles or very small particles (molecules). For example, electrical heating of embedded graphene layers can be used to force interlayer material phase changes (for example from a glassy state to liquid or back), thereby providing further control options over molecular transport between layers.

In addition to the foregoing uses in gas separation described hereinabove, it is to be recognized that the membranes described herein can also be used in a variety of other applications. Illustrative processes can include, for example, reverse osmosis filters, integrated circuits, flat panel displays, electrodes, flexible solar cells, desalination, and other molecular filtration processes, both in the gas and liquid phases.

Although the disclosure has been described with reference to the disclosed embodiments, one having ordinary skill in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials and synthetic methods other than those specifically exemplified can be employed in the practice of the invention without resort to undue experimentation. All art-known functional equivalents, of any such methods, device elements, starting materials and synthetic methods are intended to be included in this invention. Whenever a range is given in the specification, for example, a temperature range, a time range, or a composition range, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The preceding definitions are provided to clarify their specific use in the context of the invention.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

We claim:

1. A composite membrane for separation of a first gas from a second gas; said separation membrane comprising:

at least one dense polymeric membrane characterized by a permeability for said first gas greater than or equal to $7.5 \times 10^{-11}$ $cm^3$ $cm^{-2}$ $s^{-1}$ $kPa^{-1}$;

at least one layer of a perforated two-dimensional material; and a plurality of dielectric layers electrically connected to a voltage source, wherein the plurality of dielectric layers are arranged to charge the at least one layer of the perforated two-dimensional material to control the movement of particles contained within the first gas and particles contained within the second gas through the at least one layer of the perforated two-dimensional material, wherein said composite membrane is arranged to provide preferential transport of said first gas relative to said second gas through said at least one dense polymer membrane and said at least one layer of said perforated two-dimensional material, wherein the at least one dense polymeric membrane is configured to provide preferential transport of the first gas relative to the second gas by solution-diffusion, and wherein the at least one layer of the perforated two-dimensional material is configured to provide preferential transport of the first gas relative to the second gas by molecular separation.

2. The composite membrane of claim 1, wherein a net gas separation selectivity for said first gas relative to said second gas is greater than or equal to 100.

3. The composite membrane of claim 1, wherein each of said dense polymeric membranes independently has a thickness less than or equal to 50 microns.

4. The composite membrane of claim 1, wherein each of said dense polymeric membranes independently comprises a fluorocarbon, hydrocarbon, polysilicone, polyimide, cellulose acetate, polysulfone, polyethersulfone, and polycarbonate or any combination of these.

5. The composite membrane of claim 1, wherein each of said layers of perforated two-dimensional material is independently characterized by a thickness selected from the range of 0.3 to 5 nm.

6. The composite membrane of claim 1, wherein each of said layers of perforated two-dimensional material is independently characterized by a plurality of holes independently having cross sectional dimensions less than or equal to 10 angstroms.

7. The composite membrane of claim 6, wherein said plurality of holes independently have cross sectional dimensions selected over the range of 3 to 5 angstroms.

8. The composite membrane of claim 1, wherein each of said layers of perforated two-dimensional material independently comprises graphene, a graphene-based material, a transition metal dichalcogenide, molybdenum sulfide, α-boron nitride, silicone, germanene, or a combination thereof.

9. The composite membrane of claim 1, wherein each of said layers of perforated two-dimensional material independently comprises a perforated graphene-based material.

10. The composite membrane of claim 9, wherein said perforated graphene-based material comprises single-layer graphene or multi-layer graphene.

11. The composite membrane of claim 1, wherein the at least one dense polymeric membrane and the at least one layer of said perforated two-dimensional material are provided in physical contact with each other or separated by one or more intermediate structures provided in physical contact with said at least one dense polymeric membrane and said at least one layer of said perforated two-dimensional material.

12. The composite membrane of claim 1, wherein said at least one dense polymeric membrane and said at least one layer of said perforated two-dimensional material are provided in a stacked multilayer geometry.

13. The composite membrane of claim 12, wherein said stacked multilayer geometry comprises a first dense polymeric membrane in physical contact with a first layer of said perforated two-dimensional material.

14. The composite membrane of claim 13, wherein said stacked multilayer geometry further comprises a second dense polymeric membrane wherein said first layer of said perforated two-dimensional material is provided between, and in physical contact with, said first and second dense polymeric membranes.

15. A method for separating a first gas from a second gas; said method comprising the steps of:

providing a composite membrane comprising:
at least one dense polymeric membrane characterized by a permeability for said first gas greater than or equal to $7.5 \times 10^{-11}$ $cm^3$ $cm^{-2}$ $s^{-1}$ $kPa^{-1}$;
at least one layer of a perforated two-dimensional material; and
a plurality of dielectric layers electrically connected to a voltage source; and contacting an external surface of said composite membrane with said first gas and said second gas;

wherein the plurality of dielectric layers are arranged to charge the at least one layer of the perforated two-dimensional material to control the movement of particles contained within the first gas and particles contained within the second gas through the at least one layer of the perforated two-dimensional material, wherein said composite membrane provides preferential transport of said first gas relative to said second gas through said at least one dense polymer membrane and said at least one layer of perforated two-dimensional material, thereby separating said first gas from said second gas, wherein the at least one dense polymeric membrane is configured to provide preferential transport of the first gas relative to the second gas by solution-diffusion, and wherein the at least one layer of the perforated two-dimensional material is configured to provide preferential transport of the first gas relative to the second gas by molecular separation.

16. The method of claim 15, wherein methane is said second gas and said first gas is selected from the group consisting of $CO_2$, $H_2O$, $H_2S$ or any combination of these.

17. The method of claim 15, wherein said method is carried out at a temperature at said external surface selected over the range of 200 K to 600 K.

18. The composite membrane of claim 1, wherein the at least one layer of the perforated two-dimensional material is chemically functionalized.

* * * * *